(12) United States Patent
Motozuka et al.

(10) Patent No.: US 10,644,899 B2
(45) Date of Patent: May 5, 2020

(54) TRANSMISSION APPARATUS, TRANSMISSION METHOD, RECEPTION APPARATUS AND RECEPTION METHOD

(71) Applicant: Panasonic Intellectual Property Management Co., Ltd., Osaka (JP)

(72) Inventors: Hiroyuki Motozuka, Kanagawa (JP); Naganori Shirakata, Kanagawa (JP); Takenori Sakamoto, Kanagawa (JP); Masataka Irie, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/893,454

(22) Filed: Feb. 9, 2018

(65) Prior Publication Data

US 2018/0167230 A1 Jun. 14, 2018

Related U.S. Application Data

(63) Continuation of application No. PCT/JP2016/003393, filed on Jul. 20, 2016.

(30) Foreign Application Priority Data

Sep. 10, 2015 (JP) ................................. 2015-178812

(51) Int. Cl.
*H04L 12/28* (2006.01)
*H04L 5/00* (2006.01)
(Continued)

(52) U.S. Cl.
CPC ....... *H04L 12/2865* (2013.01); *H04B 1/0007* (2013.01); *H04L 5/001* (2013.01);
(Continued)

(58) Field of Classification Search
CPC combination set(s) only.
See application file for complete search history.

(56) References Cited

U.S. PATENT DOCUMENTS

| 2003/0142621 A1* | 7/2003 | Uesugi | H04L 27/2614 370/203 |
| 2010/0226315 A1* | 9/2010 | Das | H04L 1/0088 370/328 |

(Continued)

FOREIGN PATENT DOCUMENTS

JP 2011-524702 A 9/2011

OTHER PUBLICATIONS

International Search Report of PCT application No. PCT/JP2016/003393 dated Aug. 16, 2016.
(Continued)

*Primary Examiner* — Wednel Cadeau
(74) *Attorney, Agent, or Firm* — Seed IP Law Group LLP

(57) ABSTRACT

In a transmission apparatus, signal carrier signal circuitry that generates two single carrier signals including a legacy preamble signal, a legacy header signal and an extension header signal respectively. OFDM signal circuitry that generates one OFDM signal by performing an IFFT processing on one or more payload signals. Transmission circuitry that transmits the two single carrier signals by allocating to a bonding channel which is formed by bonding two adjacent channels used in a bonding transmission scheme and the one OFDM signal by allocating to the bonding channel which is frequency-shifted.

12 Claims, 25 Drawing Sheets

(51) Int. Cl.
  *H04L 27/26* (2006.01)
  *H04B 1/00* (2006.01)
  *H04W 84/12* (2009.01)

(52) U.S. Cl.
  CPC .......... *H04L 5/0044* (2013.01); *H04L 27/265* (2013.01); *H04L 27/2613* (2013.01); *H04L 27/2628* (2013.01); *H04L 27/2636* (2013.01); *H04W 84/12* (2013.01)

(56) References Cited

U.S. PATENT DOCUMENTS

| 2011/0103333 | A1  | 5/2011  | Berggren et al. | |
|---|---|---|---|---|
| 2011/0103406 | A1* | 5/2011  | Cai | H04L 5/0044 370/480 |
| 2016/0323755 | A1* | 11/2016 | Cordeiro | H04J 13/0014 |
| 2017/0070995 | A1* | 3/2017  | Eitan | H04L 5/001 |

OTHER PUBLICATIONS

IEEE Std 802.11TM-2012, IEEE Standard for Information Technology—Telecommunications and Information Exchange between systems Local and Metropolitan area networks—Specific requirements Part 11: Wireless LAN Medium Access Control (MAC) and Physical Layer (PHY) Specifications, Mar. 29, 2012.

IEEE Std 802.11adTM-2012, IEEE Standard for Information Technology—Telecommunications and Information Exchange between systems Local and Metropolitan area networks—Specific requirements Part 11: Wireless LAN Medium Access Control (MAC) and Physical Layer (PHY) Specifications Amendment 3: Enhancements for Very High Throughput in the 60 GHz Band, 9.35 DMG beamforming, Dec. 28, 2012.

* cited by examiner

TRANSMISSION APPARATUS, TRANSMISSION METHOD, RECEPTION APPARATUS AND RECEPTION METHOD

BACKGROUND

1. Technical Field

The present disclosure relates to a transmission apparatus, a transmission method, a reception apparatus and a reception method using a millimeter wave communication.

2. Description of the Related Art

IEEE 802.11 is one of wireless LAN related standards, and includes IEEE802.11n standard (hereafter, referred to as "11n standard"), IEEE802.11ad standard (hereinafter, referred to as "11ad standard"), and the like (see, for example, IEEE Std 802.11™-2012 and IEEE Std 802.11ad™-2012).

The 11n standard supports compatibility between 2.4 GHz and 5 GHz, and provides a high throughput higher than 100 Mbps in MAC layers, In the 11n standard, use of OFDM (Orthogonal Frequency Division Multiplexing) transmission as a secondary modulation scheme is stipulated.

Furthermore, to enhance the peak throughput, the 11n standard supports channel bonding in which, in data transmission, a data field is allocated across two adjacent channels each having a bandwidth of 20 MHz, that is, the data field (payload) is allocated in a bandwidth of 40 MHz. In the 11n standard, a preamble (including L-STF, L-LTF, L-SIG, HT-SIG) is allocated in each channel such that reception is possible even for a terminal that does not support the channel bonding.

According to the 11ad standard, a high-speed communication at a maximum of 7 Gbps is achieved using a plurality of channels of a millimeter wave in a 60 GHz band. In the 11ad standard, as secondary modulation schemes, single carrier transmission and OFDM transmission are stipulated. As a means of further enhancing a peak throughput compared with that achieved by the 11ad standard, in addition to the channel bonding, a communication standard using carrier aggregation has been proposed.

SUMMARY

To perform carrier aggregation, it is necessary to use a high frequency (RF: Radio Frequency) circuit with a wideband corresponding to the number of channels used at the same time, and an analog front end circuit (for example, a D/A converter, an A/D converter). Furthermore, in carrier aggregation using OFDM transmission according to the 11ad standard, unlike the channel bonding, it is necessary to perform an up-sampling process and a filtering process for each channel, and thus it is difficult to achieve a reduction in apparatus size, a reduction in consumption power, and a reduction in cost (by using general-purpose semiconductor technology).

Furthermore, in the OFDM transmission according to the 11ad standard, if the up-sampling process and the filtering process are performed for each channel as with the single carrier transmission, it is difficult to achieve a reduction in apparatus size, a reduction in consumption power, and a reduction in cost.

One non-limiting and exemplary embodiment provides a communication apparatus and a communication method according to the 11ad standard.

In one general aspect, the techniques disclosed here feature A transmission apparatus including signal carrier signal circuitry that generates two single carrier signals including a legacy preamble signal, a legacy header signal and an extension header signal respectively, OFDM signal circuitry that generates one OFDM signal by performing an IFFT processing on one or more payload signals, and transmission circuitry that transmits the two single carrier signals by allocating to a bonding channel which is formed by bonding two adjacent channels used in a bonding transmission scheme and the one OFDM signal by allocating to the bonding channel which is frequency-shifted.

According to the aspect of the present disclosure, in aggregation transmission using a communication apparatus or according to a communication method using a millimeter wave communication, it becomes unnecessary to perform the up-sampling process and the filtering process, and thus it becomes possible to achieve a reduction in apparatus size, a reduction in consumption power, and a reduction in cost.

General or specific embodiments may be implemented as a system, an apparatus, a method, an integrated circuit, a computer program, or a storage medium or any combination of a system, an apparatus, a method, an integrated circuit, a computer program, and a storage.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The present disclosure is described in further detail below with reference to an embodiment in conjunction with drawings.

A method of increasing the peak throughput other than the channel bonding is aggregation transmission in which two adjacent channels each having a bandwidth of 20 MHz are combined together, and a preamble and a data field (Payload) are allocated in a resultant bandwidth of 40 MHz thereby transmitting a signal.

Figure 1:
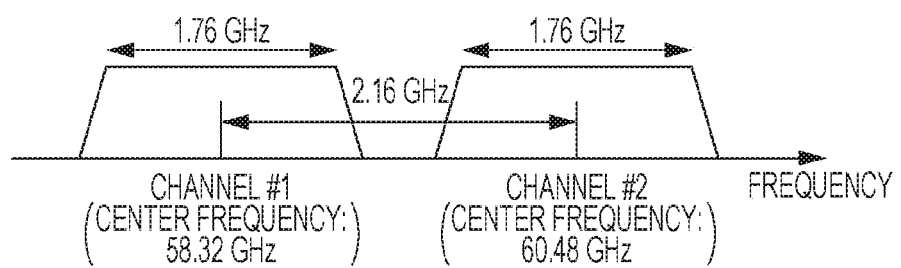
FIG. 1 is a diagram illustrating an example of a spectrum in an aggregation transmission of a millimeter wave communication.

FIG. 1 illustrates an example of a spectrum in aggregation transmission of a millimeter wave communication.

In FIG. 1, the channel interval between two adjacent channels is determined to be 2.16 GHz, and the bandwidth of each channel is determined to be 1.76 GHz. As an example, a description is given below for a case where aggregation transmission is performed using two adjacent channels, i.e., a channel 1 and channel 2.

OFDM Transmission

Referring to FIG. 2 to FIG. 6, an example of a configuration and an example of an operation of a communication apparatus 1 that performs aggregation in an OFDM transmission.

Figure 2:
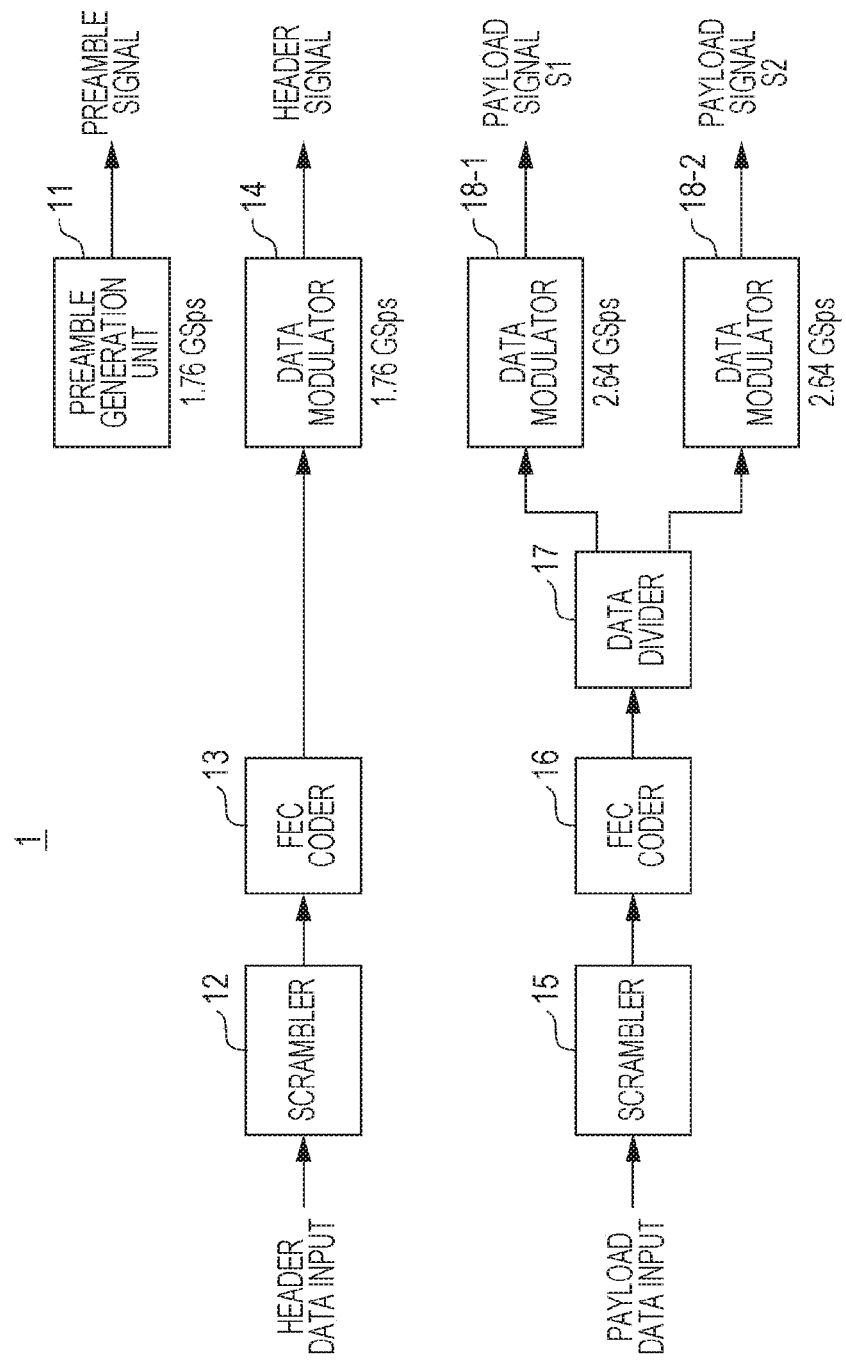
FIG. 2 is a diagram illustrating an example of a configuration of a communication apparatus configured to perform an OFDM transmission.

FIG. 2 is a block diagram illustrating blocks that are part of the communication apparatus 1 and that are involved in processing each data until modulated data is obtained. The communication apparatus 1 illustrated in FIG. 2 includes a preamble generator 11, scramblers 12 and 15, FEC coders 13 and 16, data modulators 14, 18-1, and 18-2, and a data divider 17.

Figure 3:
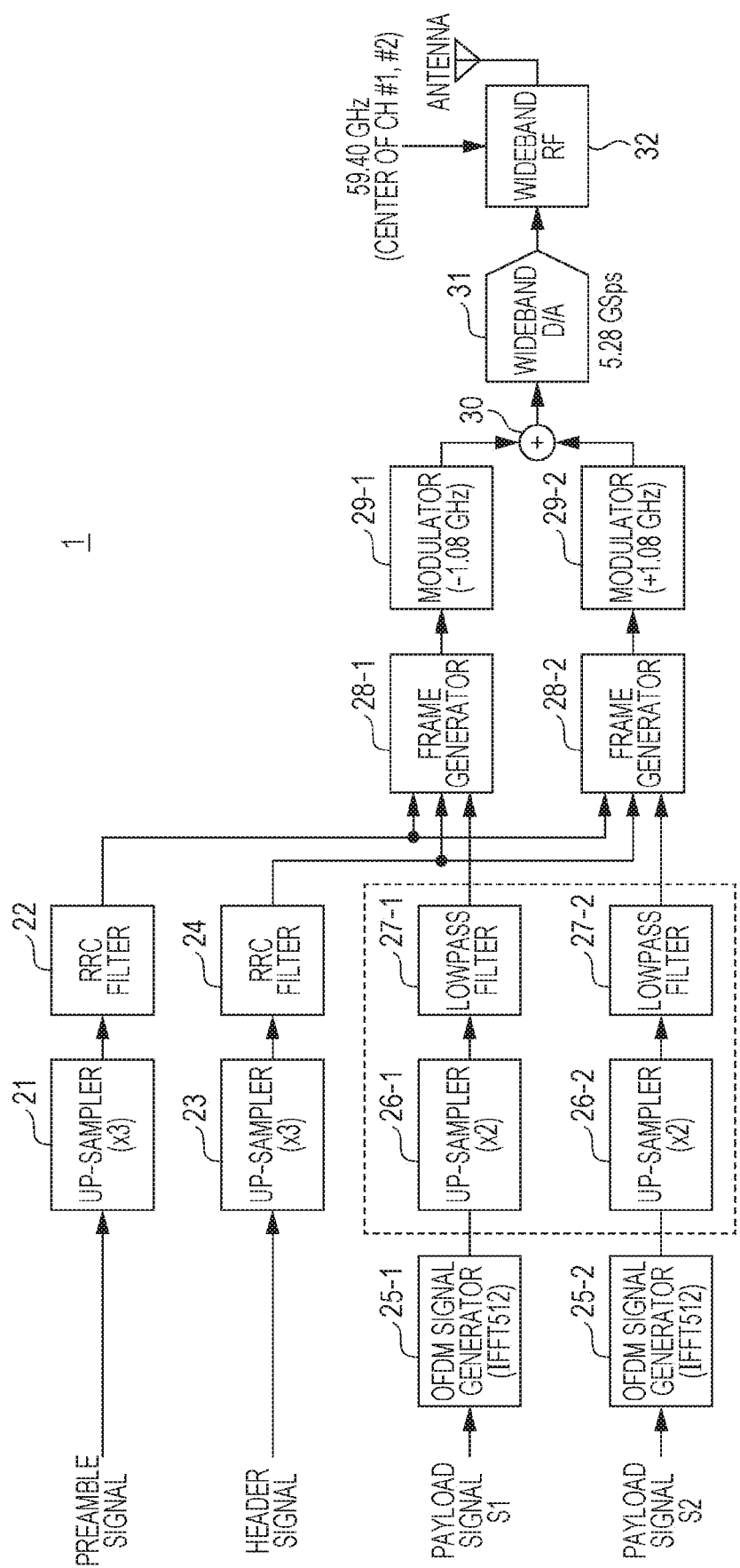
FIG. 3 is a diagram illustrating an example of a configuration of a communication apparatus configured to perform an OFDM transmission.

FIG. 3 is a block diagram illustrating blocks that are part of the communication apparatus 1 and that are involved in processing the signal generated by the part shown in FIG. 2 and transmitting resultant signals. The communication apparatus 1 illustrated in FIG. 3 includes up-samplers 21, 23, 26-1, and 26-2, filters (RRC filters) 22 and 24, OFDM signal generators 25-1 and 25-2, lowpass filters 27-1 and 27-2, frame generators 28-1 and 28-2, modulators 29-1 and 29-2, an adder 30, a wideband D/A converter 31, and a wideband radio (RF) processor 32, and an antenna.

Figure 4:
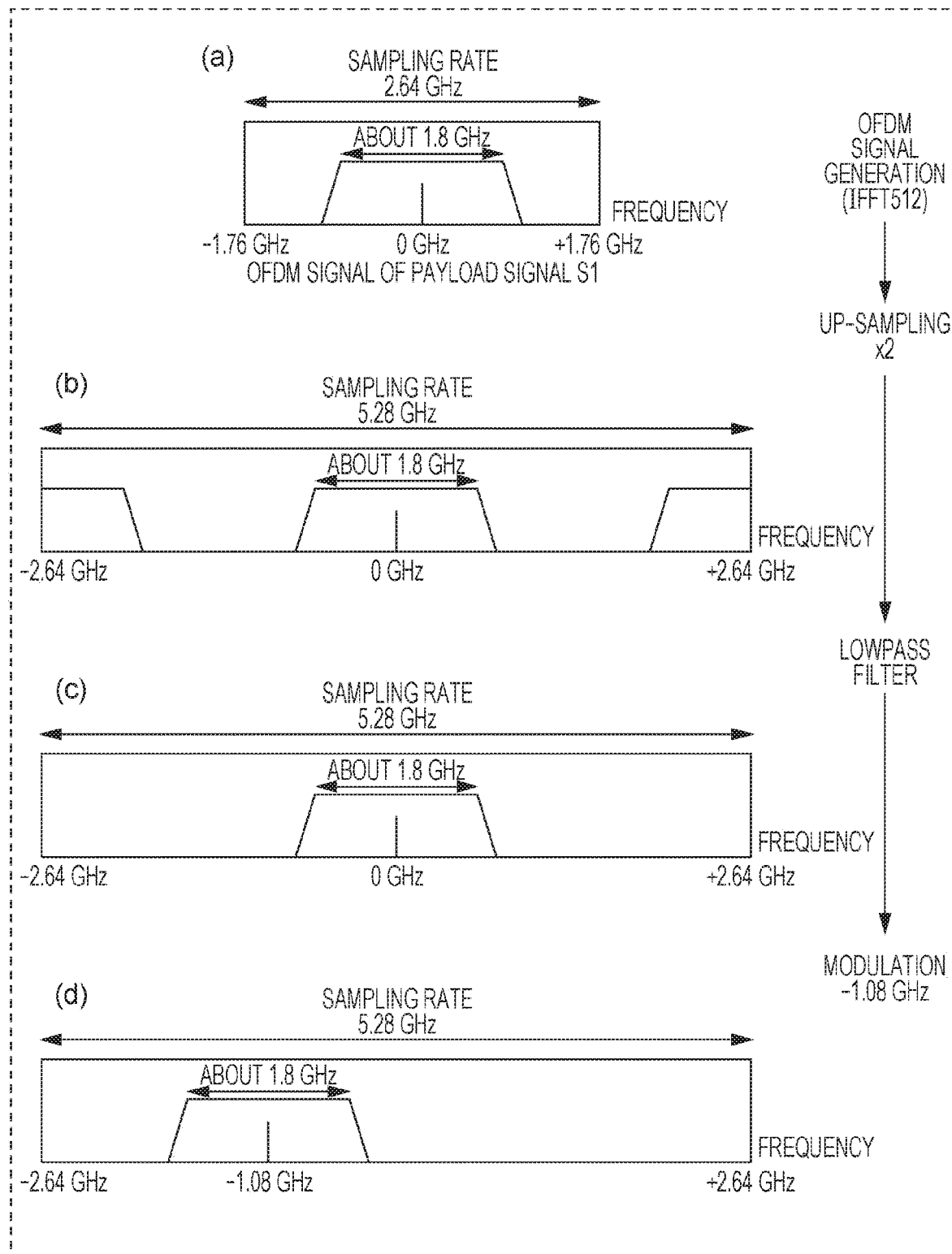
FIG. 4 is a diagram illustrating an example of a process on a payload signal S1.
Figure 5:
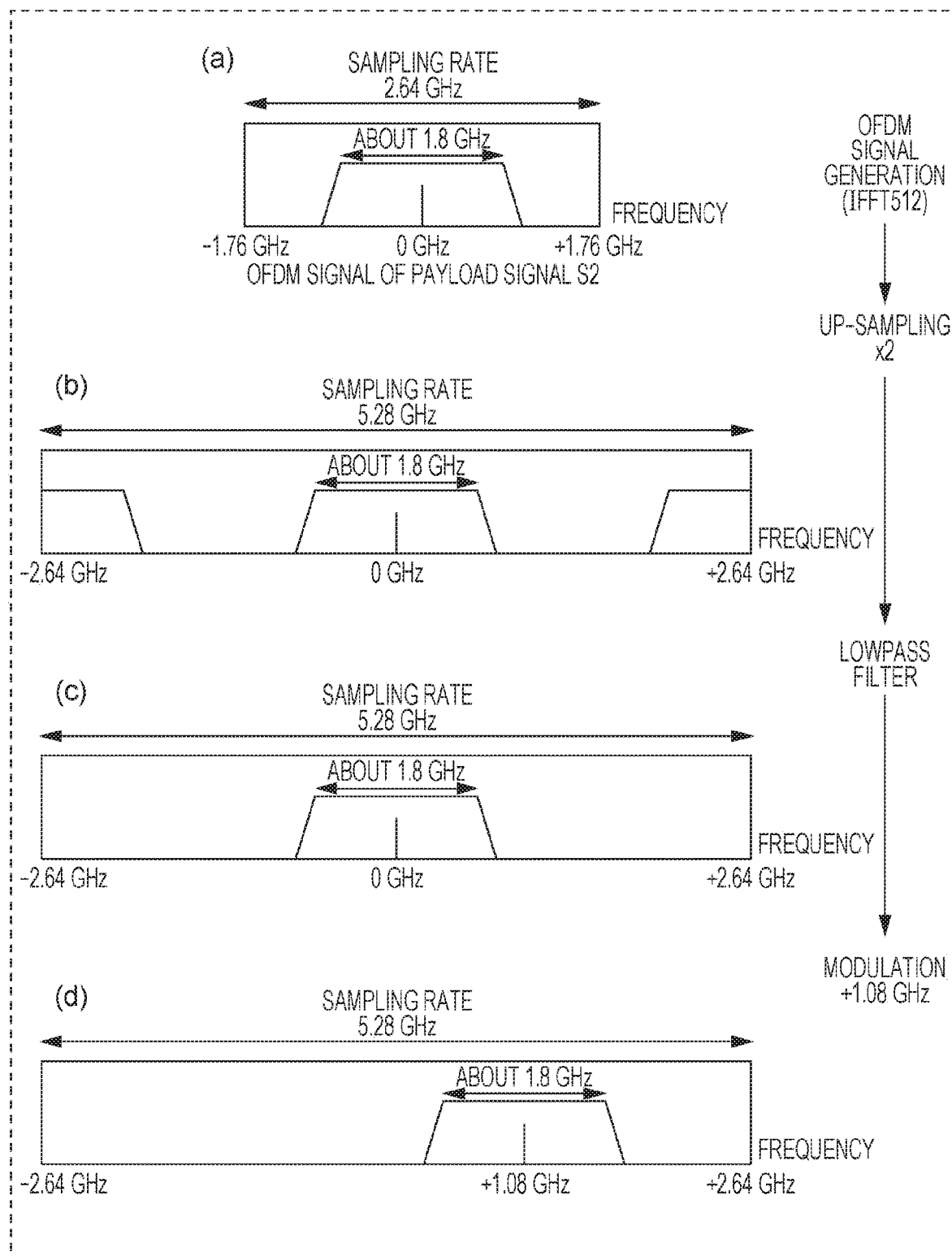
FIG. 5 is a diagram illustrating an example of a process on a payload signal S2.
Figure 6:
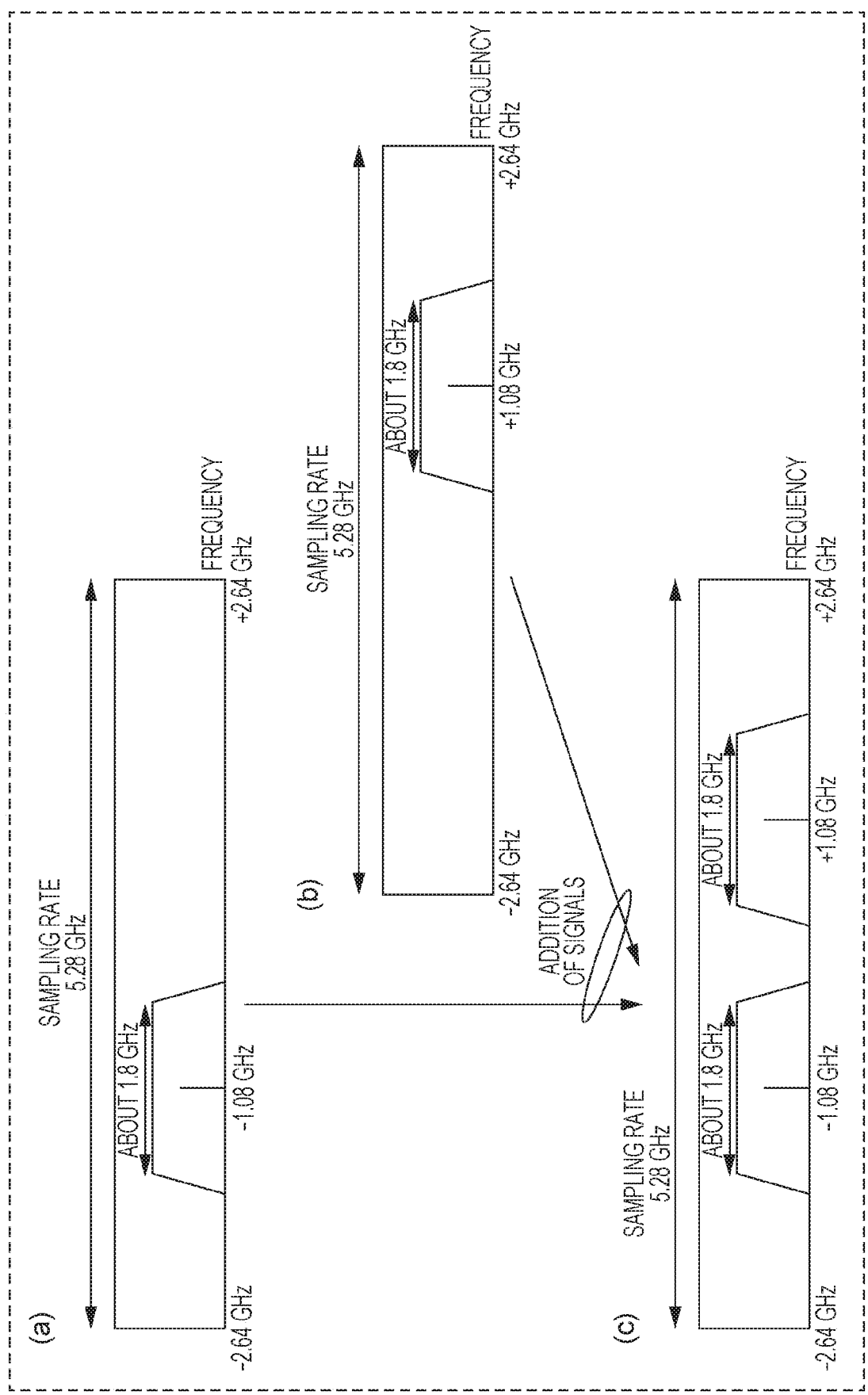
FIG. 6 is a diagram illustrating an example of a process of adding signals of respective channels.

FIG. 4 illustrates an example of an operation of a part illustrated in FIG. 3 (the OFDM signal generator 25-1, the up-sampler 26-1, the lowpass filter 27-1, and the modulator 29-1) that performs a process on a payload signal S1, and FIG. 5 illustrates an example of an operation of a part illustrated in FIG. 3 (the OFDM signal generator 25-2, the up-sampler 26-2, the lowpass filter 27-2, and the modulator 29-2) that performs a process on a payload signal S2. FIG. 6 illustrates an example of an operation of the adder 30 illustrated in FIG. 3 FIG. 4 to FIG. 6 illustrate the payload signal S1 and the payload signal S2.

In the communication apparatus 1 illustrated in FIG. 2, the preamble generator 11 generates a preamble signal (symbol rate: for example, 1.76 GSps).

The scrambler 12 performs a scrambling process on input header data, the FEC (Forward Error Correction) coder 13 performs error-correction coding on the header data, and the data modulator 14 performs data modulation on the coded header data (symbol rate: for example, 1.76 GSps, π/2-BPSK) thereby generating a header signal.

The scrambler 15 performs a scrambling process on input payload data, the FEC coder 16 performs error-correction coding on the payload data, and the data divider 17 divides the payload data into payload data 1 and 2 respectively corresponding to the two channels 1 and 2. The data modulator 18-1 modulates the payload data of the channel 1 (symbol rate: for example, 2.64 GSps) thereby generating a payload signal S1, and the data modulator 18-2 modulates the payload data of the channel 2 (symbol rate: for example, 2.64 GSps) thereby generating a payload signal S2.

In FIG. 3, the up-sampler 21 up-samples the preamble signal input from the preamble generator 11 illustrated in FIG. 2 to a sampling rate three times higher than that of the input preamble signal. The filter 22 performs filtering on the up-sampled preamble signal.

The up-sampler 23 up-samples the header signal input from the data modulator 14 to a sampling rate three times higher than that of the input header signal. The filter 24 performs filtering on the up-sampled header signal.

The filter 22 and the filter 24 are, for example, RRC (Root Raised Cosine) filters.

The OFDM signal generator 25-1 performs an IFFT process on the payload signal S1 input from the data modulator 18-1 illustrated in FIG. 2 thereby generating an OFDM signal. For example, in an example illustrated in part (a) of FIG. 4, the OFDM signal generator 25-1 performs the IFFT process with a sampling rate=2.64 GHz and an FFT size=512. The up-sampler 26-1 up-samples the OFDM signal of the payload signal S1 to a sampling rate two times higher than that of the input OFDM signal (see, for example, part (b) of FIG. 4). The lowpass filter 27-1 passes a particular band of the OFDM signal of the up-sampled payload signal S1 (see, for example, part (c) of FIG. 4).

The OFDM signal generator 25-2 performs an IFFT process on the payload signal S2 input from the data modulator 18-2 illustrated in FIG. 2 thereby generating an OFDM signal. For example, in an example illustrated in part (a) of FIG. 5, the OFDM signal generator 25-2 performs the IFFT process with a sampling rate=2.64 GHz and an FFT size=512. The up-sampler 26-2 up-samples the OFDM signal of the payload signal S2 to a sampling rate two times greater than that of the input OFDM signal (see, for example, part (b) of FIG. 5). The lowpass filter 27-2 passes a particular band of the OFDM signal of the up-sampled payload signal S2 (see, for example, part (c) of FIG. 5).

The frame generator 28-1 generates a frame including the preamble signal input from the filter 22, the header signal input from the filter 24, and the OFDM signal of the payload signal S1 input from the lowpass filter 27-1. The modulator 29-1 performs a modulation on the frame of the channel 1 such that the center frequency of the frame of the channel 1 is shifted by −1.08 GHz (see, for example, part (d) of FIG. 4).

The frame generator 28-2 generates a frame including the preamble signal input from the filter 22, the header signal input from the filter 24, and the OFDM signal of the payload signal S2 input from the lowpass filter 27-2. The modulator 29-2 performs a modulation on the frame of the channel 2 such that the center frequency of the frame of the channel 2 is shifted by +1.08 GHz (see, for example, part (d) of FIG. 5).

The adder 30 adds (see, for example, part (c) of FIG. 6) a signal of the channel 1 input from the modulator 29-1 (see, for example, part (a) of FIG. 6) and a signal of the channel 2 input from the modulator 29-2 (see, for example, part (b) of FIG. 6). The wideband D/A converter 31 performs a D/A conversion on the signal obtained as a result of the addition (symbol rate: for example, 5.28 GSps). The wideband radio processor 32 (RF circuit) performs a radio transmission process on the signal obtained as a result of the D/A conversion thereby generating a radio signal with a center frequency (for example, 59.40 GHz in the case in FIG. 1) that is the center of the channel 1 and the channel 2. The generated radio signal is transmitted via an antenna.

An example of a configuration of the communication apparatus 1 configured to perform an aggregation transmission in an OFDM transmission has been described above.

In the configuration illustrated in FIG. 3, in a case where the aggregation transmission is applied over a plurality of channels, it is necessary to perform as many up-sampling processes and as many lowpass filtering processes (performed by the part enclosed by a broken line in FIG. 3) as there are channels, which results in increases in complexity, consumption power, and cost of the apparatus.

On the other hand, in the configuration illustrated in FIG. 3, in a case where the FFT sizes of the OFDM signal generator 25-1 and the OFDM signal generator 25-2 are increased, by a factor of two, to 1024, it becomes possible to achieve a waveform illustrated in part (c) of FIG. 5, and thus it becomes unnecessary to perform the lowpass filtering process. However, it is inefficient to perform the process with FFT size=1024 for each channel.

In view of the above, in an aspect of the present disclosure, a transmission process in an OFDM transmission according to the 11ad standard is performed in an efficient manner, and a reduction in apparatus size, a reduction in consumption power, and a reduction in cost are achieved.

First Embodiment

Configuration of Communication Apparatus

Figure 7:
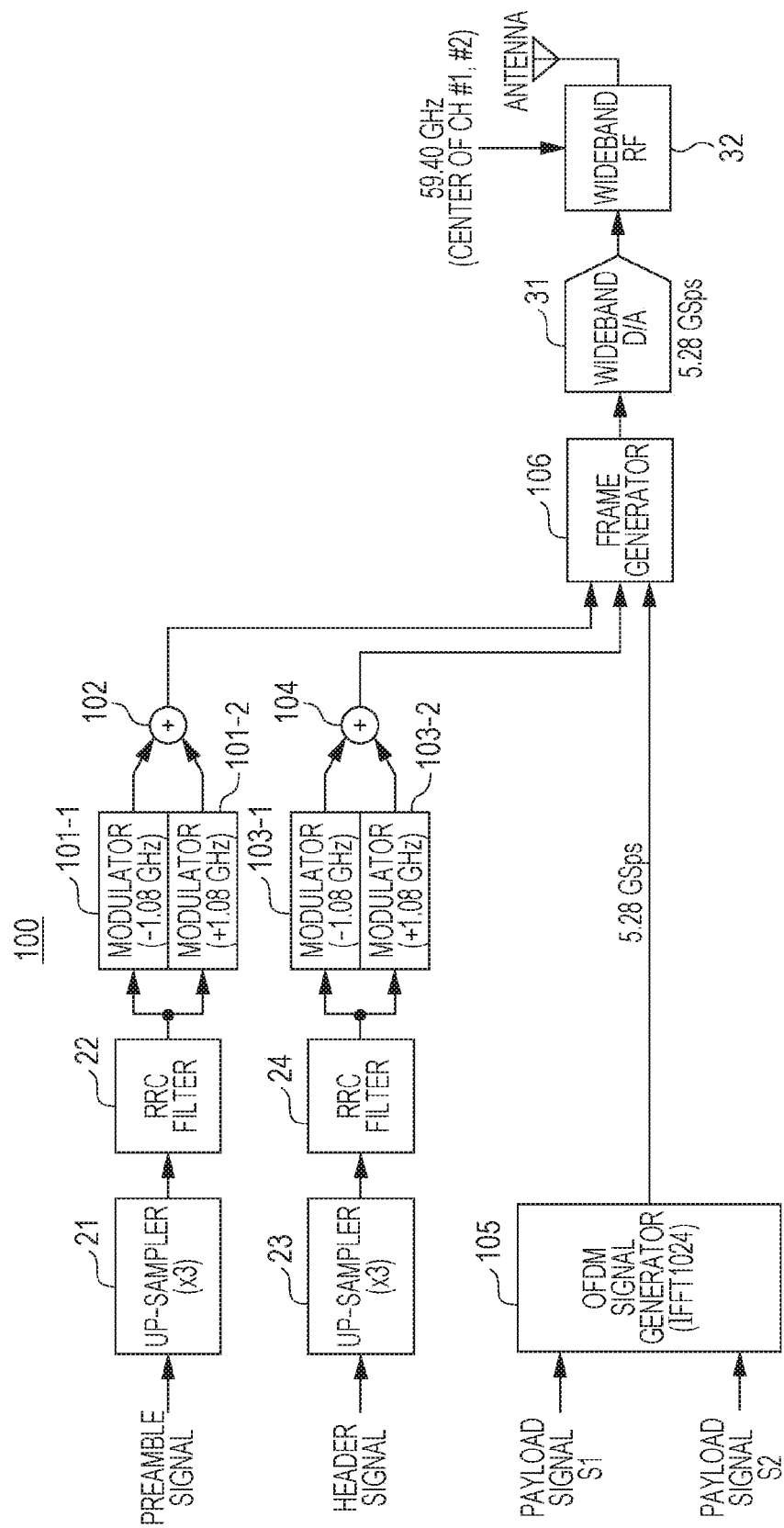
FIG. 7 is a diagram illustrating an example of a configuration of a communication apparatus according to a first embodiment.

Referring to FIG. 7, an example of a configuration of a communication apparatus 100 according to a present embodiment is described below. Note that in the communication apparatus 100, a part that performs a process performed until each modulated data is obtained is similar in configuration and operation to the part of the communication apparatus 1 illustrated in FIG. 2, and thus a description thereof is omitted. Furthermore, in the communication apparatus 100 illustrated in FIG. 7, elements similar to those in the communication apparatus 1 illustrated in FIG. 3 are denoted by the same symbols and a description thereof is omitted.

In FIG. 7, a modulator 101-1 performs a modulation on a preamble signal such that the center frequency of the preamble signal is shifted by −1.08 GHz, As a result, a preamble signal of a channel 1 is generated. A modulator 101-2 performs a modulation on a preamble signal such that the center frequency of the preamble signal is shifted by +1.08 GHz. As a result, a preamble signal of a channel 2 is generated. An adder 102 adds the preamble signal of the channel 1 and the preamble signal of the channel 2, and outputs a result to a frame generator 106.

A modulator 103-1 performs a modulation on a header signal such that the center frequency of the header signal is shifted by −1.08 GHz. As a result, a header signal of a channel 1 is generated. A modulator 103-2 performs a modulation on a header signal such that the center frequency of the header signal is shifted by +1.08 GHz. As a result, a header signal of a channel 2 is generated. An adder 104 adds the header signal of the channel 1 and the header signal of the channel 2 and outputs a result to a frame generator 106.

In this manner, single carrier signals (preamble signals and header signals) of two channels are generated. That is, the modulators 101-1 and 101-2 and the modulators 103-1 and 103-2 correspond to signal carrier signal generators that perform orthogonal modulation on the respective preamble signal and the header signal in two adjacent channels used in the aggregation transmission such that two single carrier signals respectively shifted in the frequency bands of the two channels are obtained.

An OFDM signal generator 105 performs an IFFT collectively on both the payload signal S1 input from the data modulator 18-1 illustrated in FIG. 2 and the payload signal S2 input from the data modulator 18-2 illustrated in FIG. 2 thereby generating OFDM signals of the channel 1 and the channel 2. In this process, the OFDM signal generator 105 performs the IFFT process with FFT size=1024 and sampling rate=5.28 GHz.

That is, the OFDM signal generator 105 performs the IFFT process on the payload signals S1 and S2 using an FFT size and a sampling rate greater and higher (by a factor of 2) than the FFT size and the sampling rate used by the OFDM signal generators 25-1 and 25-2, illustrated in FIG. 3, respectively configured to perform IFFT process individually on the payload signals of the channels.

In other words, the OFDM signal generator 105 performs the IFFT process collectively on both the payload signals S1 and S2 mapped in a wide frequency band.

Frame Format

Next, a frame format used by the communication apparatus 100 having the configuration illustrated in FIG. 7 is described.

Figure 8:
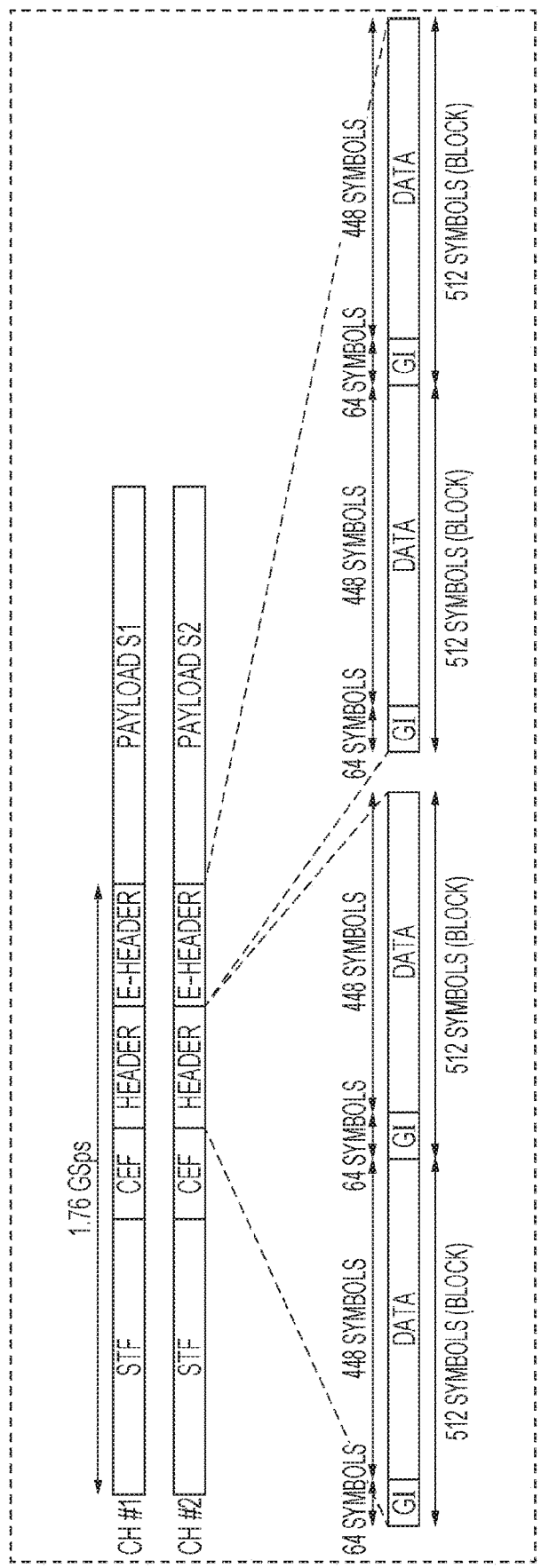
FIG. 8 is a diagram illustrating an example of a frame format according to the first embodiment.
Figure 9:
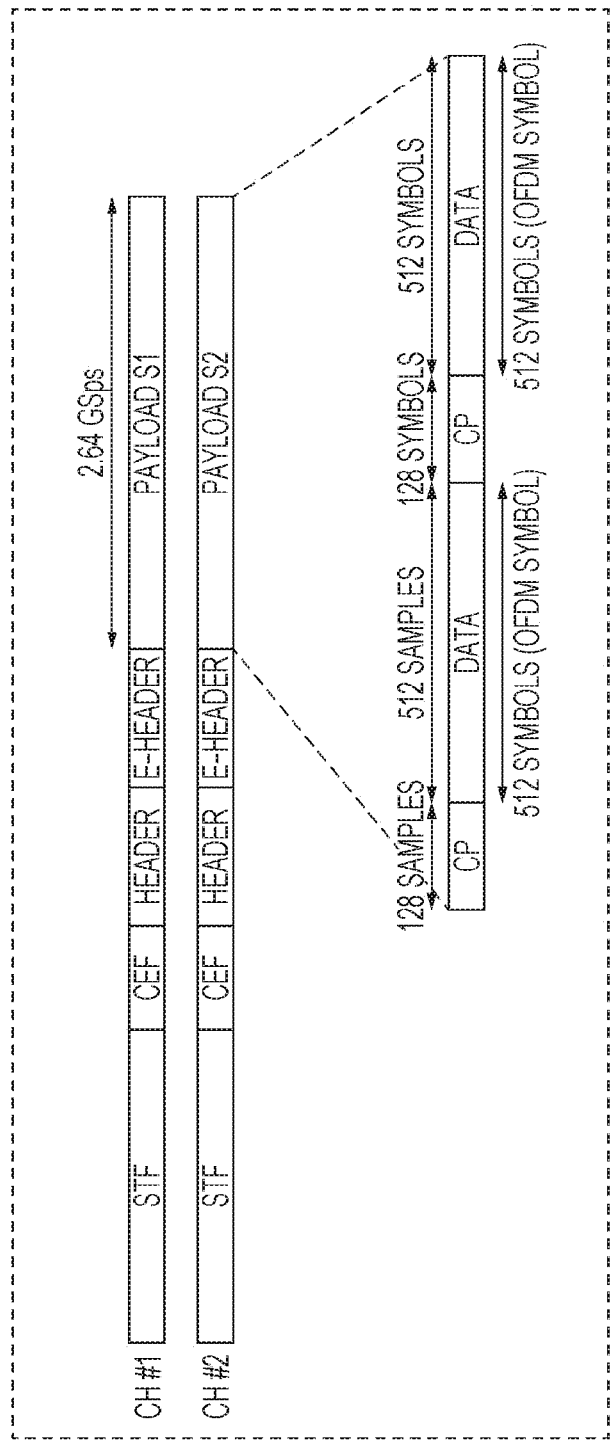
FIG. 9 is a diagram illustrating an example of a frame format according to the first embodiment.
Figure 10:
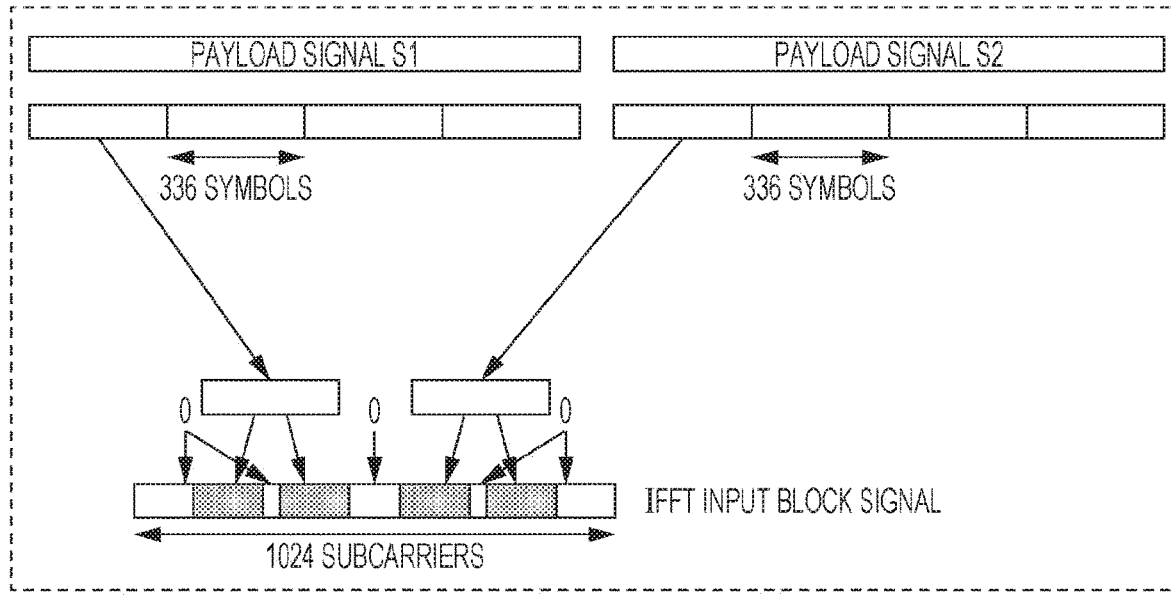
FIG. 10 is a diagram illustrating an example of a process of generating an OFDM signal according to the first embodiment.
Figure 11:
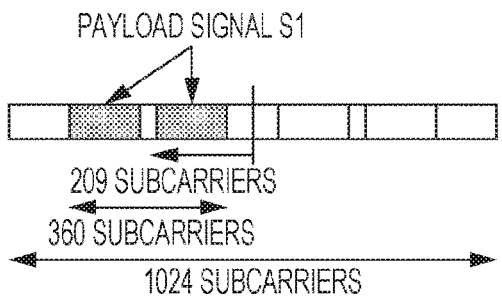
FIG. 11 is a diagram illustrating an example of a manner of mapping a payload signal according to the first embodiment.

FIG. 8, FIG. 9, and FIG. 10 illustrate an example of a frame format according to the present embodiment. FIG. 8 illustrates a structure in the header, FIG. 9 illustrates a structure in the payload for a case in the OFDM transmission is used, FIG. 10 illustrates an example of a process of generating an OFDM signal, and FIG. 11 illustrates an example of mapping of a payload signal.

As illustrated in FIG. 8 and FIG. 9, a frame of each channel includes STF (Short Training Field), CEF (Channel Estimation Field), a header (Header), an extension header (E-Header), and payloads (Payload 1 or Payload 2).

As illustrated in FIG. 8, it is assumed that the header of each channel is similar in format to that according to the 11ad standard. That is, the header is formed by concatenating a plurality of symbol blocks each including 512 symbols and is subjected to a single carrier modulation with 1.76 GSps. As illustrated in FIG. 8, each symbol block of the header includes a 64-symbol GI (Guard Interval) and a 448-symbol data field. As described above, in single carrier signals, each symbol block includes GI because it is assumed that a receiver performs a frequency domain equalization process using a 512-point FFT circuit.

Furthermore, as illustrated in FIG. 8, an extension header of each channel has the same frame structure as that of the header.

Next, a format of a payload of each channel is described. As illustrated in FIG. 9, the payload includes CP (Cyclic Prefix) and a data field.

In the 11ad standard, the OFDM symbol length is defined to be 512 samples. One of reasons for this is that use of the same size as the symbol block size (512 symbols) of the single carrier signal makes it possible to share the 512-point FFT circuit in the receiver.

Note that in the present embodiment, although the frame format for the payload is the same as that defined in 11ad, a manner of allocating subcarriers and a manner of generating an OFDM signal are different. The manner of allocating subcarriers and the manner of generating an OFDM signal are described below.

In the communication apparatus 100 illustrated in FIG. 7, an example of a manner of generating a frame format in an OFDM transmission illustrated in FIG. 9 is described below.

FIG. 10 is a diagram illustrating an example of a manner of generating a frame format.

First, the OFDM signal generator 105 divides the payload signal S1 and the payload signal S2, which have been subjected to data modulation, into parts with predetermined lengths. In FIG. 10, each payload signal is divided into parts each including 336 symbols.

Next, the OFDM signal generator 105 extracts 336 symbols from each of the payload signal S1 (the signal of the channel 1) and the payload signal S2 (the signal of the channel 2), and the OFDM signal generator 105 inserts zero-signals or pilot signals (having a known pattern preset in advance) and maps respective signals into subcarriers having a total length of 1024 subcarriers. As a result, an IFFT input block signal, which is to be input to the IFFT circuit, is obtained.

In the process described above, the payload signal S1 is mapped in an area located to the left of the center of 1024 subcarriers illustrated in FIG. 10, that is, the payload signal S1 is mapped in a frequency band lower than the center frequency. On the other hand, the payload signal S2 is mapped to the right of the center of 1024 subcarriers illustrated in FIG. 10, that is, the payload signal S2 is mapped in a frequency band higher than the center frequency.

Note that each payload signal is mapped to subcarriers, for example, such that restrictions described below are satisfied. FIG. 11 is a diagram illustrating an example of a restriction in mapping the payload signal S1. More specifically, as illustrated in FIG. 11, when the payload signal S1 divided into symbol blocks (each including, for example, 336 symbols) is mapped to 1024 subcarriers, each symbol block is mapped within a range that has a length of smaller than 360 subcarriers including a zero-signal or a pilot signal and that is centered at a location 209 subcarriers apart from the center.

Note that "209 subcarriers" correspond to 1.07765625 MHz (hereinafter, denoted as 1.077 GHz) determined so as to be closest to 1080 MHz, and "360 subcarriers" correspond to a value (1.8 GHz in this case) determined so as to satisfy a restriction in terms of a preset spectrum per channel. Thus, the payload signal S1 is mapped around the center frequency of the channel 1 (ch1).

The payload signal S2 is also mapped under the restriction as illustrated in FIG. 11.

The OFDM signal generator 105 inputs the IFFT input block signal illustrated in FIG. 10 to the IFFT circuit and adds CP to an output signal. The output signal with the added CP is further added with a preamble signal and a header signal. As a result, a transmission digital baseband signal is obtained (see FIG. 9).

This transmission digital baseband signal is then subjected to a D/A conversion at 5.28 GSps and further subjected to a radio process with a center frequency set at 59.40 GHz. As a result, a signal with a spectrum illustrated in FIG. 12 described later is transmitted.

Figure 12:
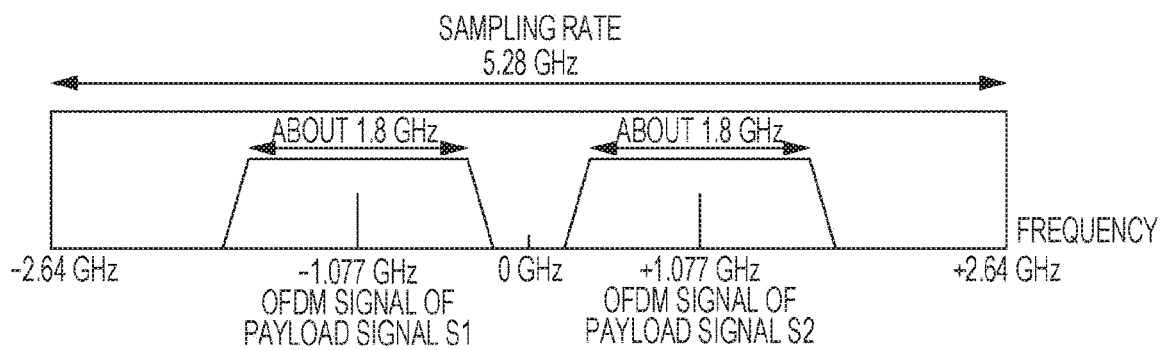
FIG. 12 is a diagram illustrating an example of a spectrum of a signal generated by a communication apparatus according to the first embodiment.

FIG. 12 illustrates an example of an OFDM signal generated by the OFDM signal generator 105.

In FIG. 12, sampling rate=5.28 GHz. Furthermore, in FIG. 12, the OFDM signal generator 105 adjusts the allocation of inputs of the payload signals S1 and S2 in the IFFT process such that in a 5.28 GHz band, the center frequency of the OFDM signal of the payload signal S1 is located about −1.08 GHz (−1.077 GHz) apart from the center frequency (0 GHz) and the center frequency of the OFDM signal of the payload signal S2 is located about +1.08 GHz (+1.077 GHz) apart from the center frequency (0 GHz).

The frame generator 106 generates frames of the channel 1 and the channel 2 using the preamble signal input from the adder 102, the header signal input from the adder 104, and the OFDM signal input from the OFDM signal generator 105.

As described above, the communication apparatus 100 generates OFDM signals collectively for both of the payload signal S1 and the payload signal S2 using a greater FFT size (1024) than that shown in FIG. 3 (FFT size: 512).

In the communication apparatus 1 shown in FIG. 3, it is necessary to perform the up-sampling process and the lowpass filtering process (performed by the part enclosed by the broken line in FIG. 3) for each channel, but in the communication apparatus 100 according to the present embodiment shown in FIG. 7, it is unnecessary to perform the up-sampling process and the lowpass filtering process for each channel. That is, in the communication apparatus 100 illustrated in FIG. 7, the up-samplers 26-1 and 26-2 and the lowpass filters 27-1 and 27-2 shown in FIG. 3 are unnecessary.

According to the present embodiment, as described above, in the OFDM transmission according to the 11ad standard, when the aggregation transmission is applied, it is allowed to generate OFDM signals collectively for a plurality of channels thereby it is possible to generate OFDM signal in an efficient manner. Furthermore, it becomes unnecessary to perform the up-sampling process and the filtering process, which allows a reduction in apparatus size, a reduction in consumption power, and a reduction in cost.

Second Embodiment

In the first embodiment, as an example, the explanation has been given for the case where in the OFDM signal generator 105 (FIG. 7), sampling rate=5.28 GHz and FFT size=1024.

In this case, in the IFFT process, the interval the frequency bin of the input of the IFFT process is 5.15625 MHz (=5280 MHz/1024). Each of desirable center frequencies (at ±1080 MHz apart from the center between the channels 1 and 2) of the OFDM signals of the respective channels is not an integral multiple of the frequency bin interval (the subcarrier interval)=5.15625 MHz. That is, there is no frequency bin whose center is located at 1080 MHz. Therefore, in the OFDM signal generator 105, the center frequency (for example, ±1077.65625 MHz, in the case shown in FIG. 12) of the OFDM signal of each channel has a deviation from the desirable frequency (in FIG. 1, ±1080 MHz).

This may cause degradation in quality of a transmission signal (it may become impossible to satisfy the specification in terms of the offset of the carrier frequency). Furthermore, it becomes necessary to provide a correction circuit in a transmitter or a receiver to correct the frequency deviation described above, which results in an increase in circuit scale and an increase in consumption power.

In view of the above, the present embodiment provides a method of generating OFDM signals of payload signals S1 and S2 without generating a deviation of the center frequency of each channel.

Configuration of Communication Apparatus

Figure 13:
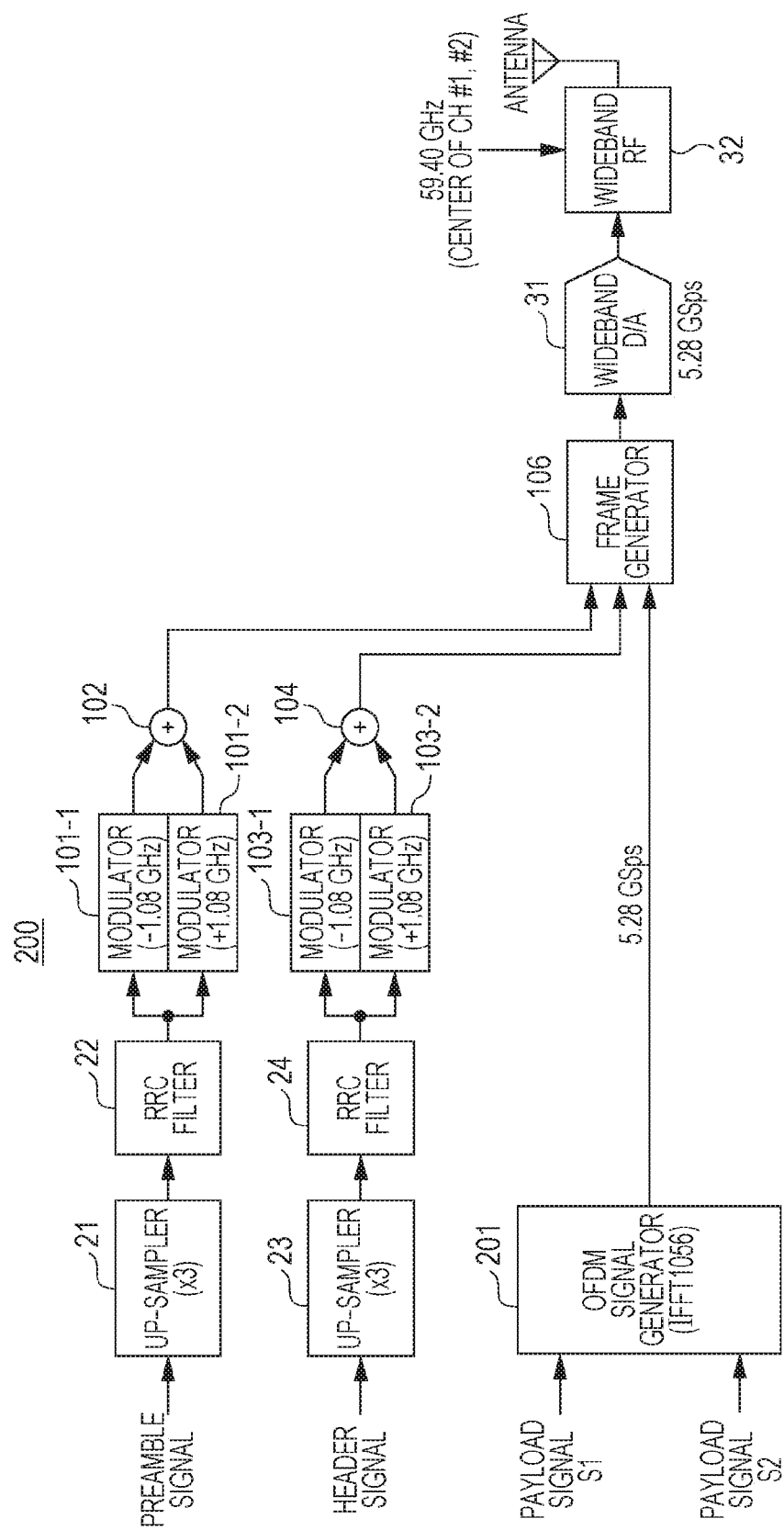
FIG. 13 is a diagram illustrating an example of a configuration of a communication apparatus according to a second embodiment.

Referring to FIG. 13, an example of a configuration of a communication apparatus 200 according to a present embodiment is described below. Note that in the communication apparatus 200, a part that performs a process performed until each modulated data is obtained is similar in configuration and operation to the part of the communication apparatus 1 illustrated in FIG. 2, and thus a description thereof is omitted. Furthermore, in the communication apparatus 200 illustrated in FIG. 13, elements similar to those according to the first embodiment (FIG. 7) are denoted by the same symbols and a description thereof is omitted.

More specifically, in the communication apparatus 200, the OFDM signal generator 201 performs, as in the first embodiment, an IFFT process on the payload signal S1 input from the data modulator 18-1 illustrated in FIG. 2 and the payload signal S2 input from the data modulator 18-2 illustrated in FIG. 2 thereby generating OFDM signals of the channel 1 and the channel 2. In this process, the OFDM signal generator 201 performs the IFFT process with FFT size=1056 and sampling rate=5.28 GHz thereby generating OFDM signals. That is, the OFDM signal generator 201 performs the IFFT process using an FFT size and a sampling rate greater and higher than the FFT size and the sampling rate used by the OFDM signal generators 25-1 and 25-2, illustrated in FIG. 3, respectively configured to perform the IFFT process individually on the payload signals of the channels.

However, the FFT size used by the OFDM signal generator 201 is different from that used in the first embodiment (the FFT size is 1024 in the case illustrated in FIG. 7).

In this case, the frequency bin of the input of the IFFT process in the OFDM signal generator 201 is 5 MHz (=5280 MHz/1056). That is, a desired center frequency (±1080 MHz from the center of each of the channels 1 and 2) of the OFDM signal of each channel is an integral multiple of the interval=5 MHz of the frequency bin. Therefore, there is a frequency bin whose center is located at 1080 MHz, and thus the OFDM signal generator 201 is capable of setting the center frequency of the OFDM signal of each channel to a desired frequency.

Figure 14:
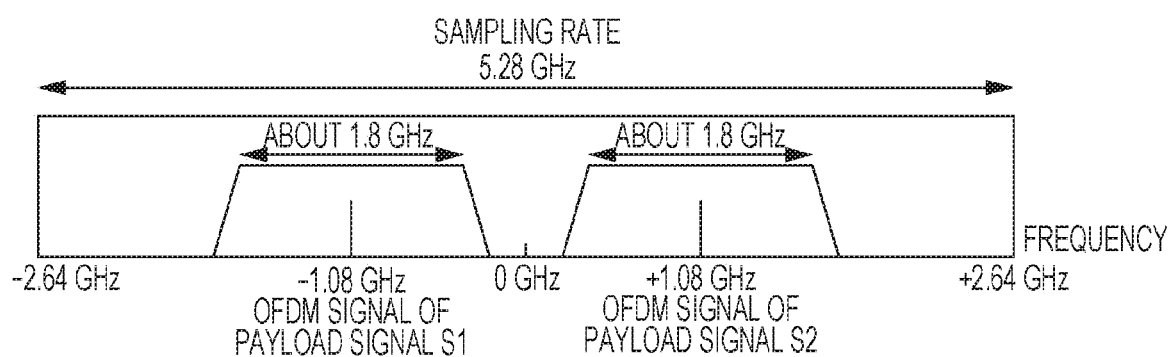
FIG. 14 is a diagram illustrating an example of a configuration of a communication apparatus according to the second embodiment.

FIG. 14 illustrates an example of an OFDM signal generated by the OFDM signal generator 201.

In FIG. 14, sampling rate=5.28 GHz. Furthermore, in FIG. 14, the OFDM signal generator 201 adjusts the allocation of inputs of the payload signals S1 and S2 in the IFFT process such that in a 5.28 GHz band, the center frequency of the OFDM signal of the payload signal S1 is located −1.08 GHz apart from the center frequency (0 GHz) and the center frequency of the OFDM signal of the payload signal S2 is located +1.08 GHz apart from the center frequency (0 GHz).

Thus, according to the present embodiment, it is possible to generate OFDM signals collectively for a plurality of channels without generating a deviation of the center frequency of the OFDM signal of each channel. This makes it possible to prevent degradation in quality of the transmission signal, an increase in circuit scale, and an increase in consumption power.

In the present embodiment, the FFT size of the OFDM signal generator 201 may be set such that the frequency bin interval in the IFFT process is equal to an aliquot divisor of the center frequency (1.08 GHz) of the OFDM signals mapped in two channels. In other words, the FFT size of the OFDM signal generator 201 may be set such that the frequency bin interval in the IFFT process is equal to an aliquot divisor of the one-half of the interval between two channels (2.16 GHz in FIG. 1).

Frame Format

Next, a frame format used by the communication apparatus 200 having the configuration illustrated in FIG. 13 is described.

Figure 15:
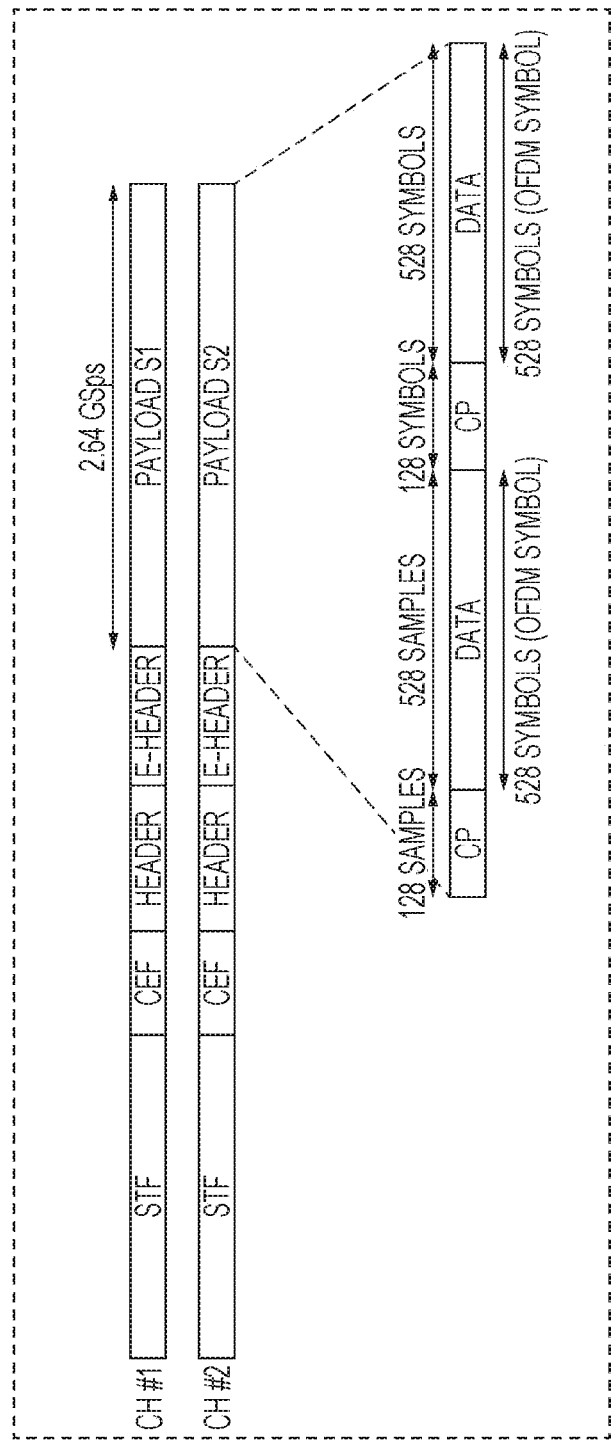
FIG. 15 is a diagram illustrating an example of a frame format according to the second embodiment.

FIG. 15 illustrate an example of a frame format according to the present embodiment, In FIG. 15 a format in a payload is illustrated for a case in the OFDM transmission is used.

As illustrated in FIG. 15, a frame of each channel includes STF (Short Training Field), CEF (Channel Estimation Field), a header (Header), an extension header (E-Header), and payloads (Payload 1 or Payload 2). Note that STF, CEF, the header, and the extension header are similar in configuration to those illustrated in FIG. 8, and thus a description thereof is omitted.

A format of a payload of each channel is described below.

In the 11ad standard, the OFDM symbol length is defined to be 512 samples. One of reasons for this is that by setting the OFDM symbol length to be equal to the symbol block size (512 symbols) of the single carrier signal, it is allowed for a receiver to share the 512-point FFT circuit.

However, in the present embodiment, the OFDM symbol length is set to be 528 samples as shown in FIG. 15. This makes it possible to set the frequency bin interval (subcarrier interval) in the IFFT process to 5 MHz when OFDM signals of the channels 1 and 2 are generated in the collective manner as described above. That is, the OFDM symbol length is determined such that the OFDM symbol length is equal to a value obtained as a result of dividing, by an integer, one-half (1.08 GHz) of the channel interval (2.16 GHz) between the channel 1 and the channel 2 (that is, an aliquot divisor of one-half of the channel interval). The relationship described above can be expressed by a following formula.

subcarrier interval=sample rate/OFDM symbol length (example of calculation) 5 MHz=2640 MSps/528 samples one-half of channel interval/216 (proper integer) =subcarrier interval (example of calculation) 1080 MHz/216=5 MHz Next, is described an example of a method of generating a frame format in the OFDM transmission shown in FIG. 15 in the communication apparatus 200 shown in FIG. 13.

Figure 16:
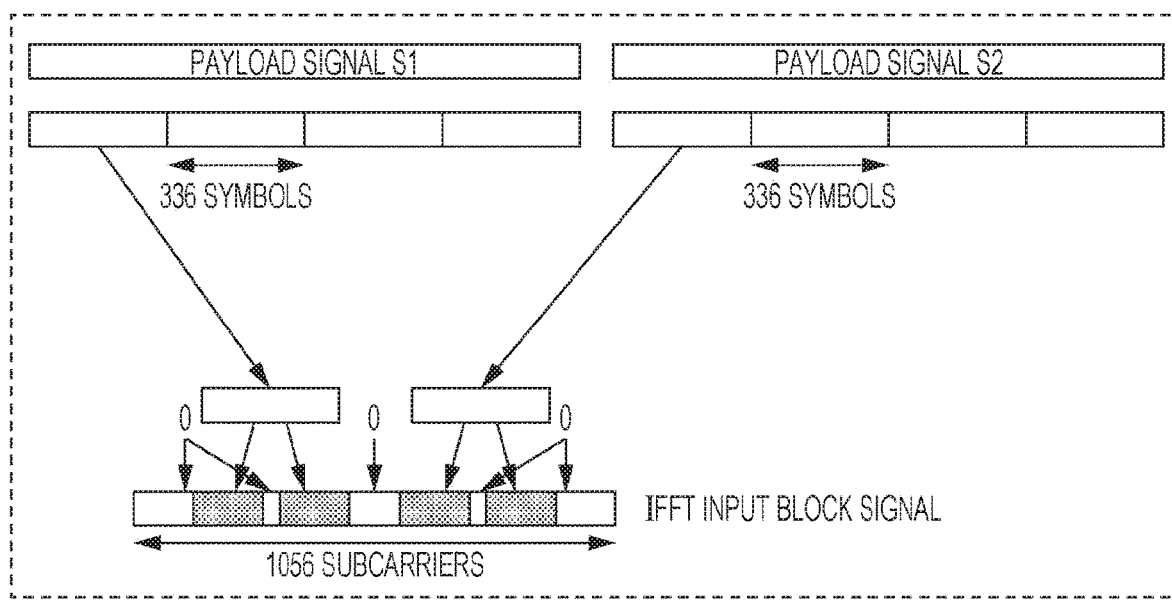
FIG. 16 is a diagram illustrating an example of a process of generating an OFDM signal according to the second embodiment.

FIG. 16 is a diagram illustrating an example of a manner of generating a frame format. The frame format shown in FIG. 16 is similar to the frame format shown in FIG. 10, and thus only a different element, that is, a data field (Data), is described below.

The OFDM signal generator 201 extracts 336 symbols from each of the payload signal S1 (the signal of the channel 1) and the payload signal S2 (the signal of the channel 2), and the OFDM signal generator 201 inserts zero-signals or pilot signals (having a known pattern preset in advance) and maps respective signals into subcarriers having a total length of 1056 subcarriers. As a result, an IFFT input block signal, which is to be input to the IFFT circuit, is obtained.

In the process described above, the payload signal S1 is mapped in an area located to the left of the center of 1056 subcarriers illustrated in FIG. 16, that is, the payload signal S1 is mapped in a frequency range lower than the center frequency. On the other hand, the payload signal S2 is mapped to the right of the center of 1056 subcarriers illustrated in FIG. 16, that is, the payload signal S2 is mapped in a frequency range higher than the center frequency.

Figure 17:
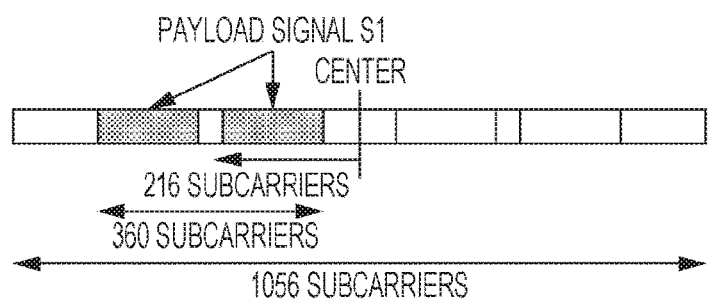
FIG. 17 is a diagram illustrating an example of a manner of mapping a payload signal according to the second embodiment.

Note that each payload signal is mapped into subcarriers, for example, such that restrictions described below are satisfied. FIG. 17 is a diagram illustrating an example of a restriction in mapping the payload signal S1. More specifically, as shown in FIG. 17, when the payload signal S1 divided into symbol blocks (each including, for example, 336 symbols) is mapped into 1056 subcarriers, each symbol block is mapped within a range that has a length of smaller than 360 subcarriers including a zero signal or a pilot signal and that is centered at a location 216 subcarriers apart from the center.

Note that "216 subcarriers" correspond to 1.08 GHz, that is, one-half of the channel interval (2.16 GHz) and "360 subcarriers" correspond to a value (1.8 GHz in this case) determined so as to satisfy a restriction in terms of a preset spectrum per channel.

The payload signal S2 is also mapped under the restriction as illustrated in FIG. 17.

This transmission digital baseband signal is then subjected to a D/A conversion at 5.28 GSps and further subjected to a radio process with a center frequency set at 59.40 GHz. As a result, a signal with a spectrum illustrated in FIG. 1 is transmitted.

Note that the signal in the frame format shown in FIG. 15 generated in the communication apparatus 200 is similar to a signal transmitted from a communication apparatus with a configuration illustrated in FIG. 19 described later. Herein "similar" means that transmission digital baseband signals are similar.

Figure 18:
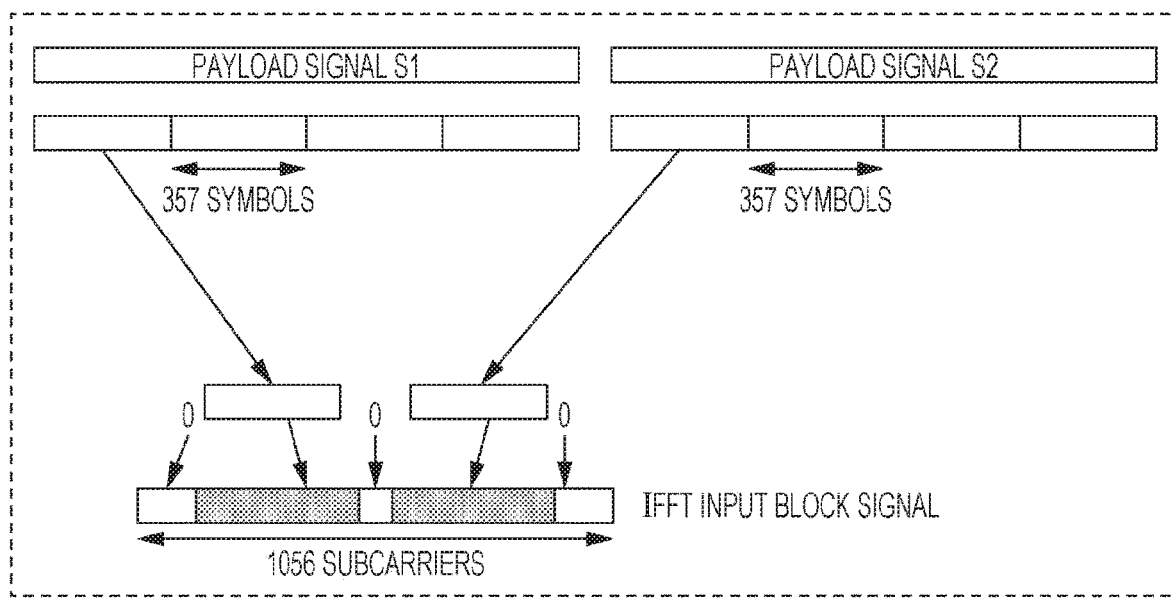
FIG. 18 is a diagram illustrating an example of a process of generating an OFDM signal according to the second embodiment.

Although in the embodiments described above, the communication apparatus is adapted to the aggregation transmission, the communication apparatus may be adapted to channel bonding. For example, a flag indicating whether the aggregation transmission or the channel bonding is specified may be added to the header. In a case where the aggregation transmission is specified, the OFDM signal generator 105 allocate block symbols in subcarriers according to FIG. 16. In a case where the channel bonding is specified, the OFDM signal generator 105 allocate block symbols in subcarriers according to FIG. 18.

In channel bonding, it is allowed to use, in signal transmission, the frequency range between the channels ch1 and ch2 and frequency ranges around center frequencies of the respective channels, and thus it is possible to achieve better throughput than is achieved by the aggregation transmission, However, channel bonding signals can be received by limited receivers. The transmitter according to the present embodiment has the capability of selecting channel bonding or aggregation transmission depending on the capability available in the receiver, and thus it is possible to select an optimum transmission mode, which allows an increase in throughput.

As for the capability of the receiver, by notifying in advance the transmitter that a particular bit indicates whether the receiver has the capability of channel bonding or not, it becomes possible for the transmitter to determine the capability of the receiver.

Figure 19:
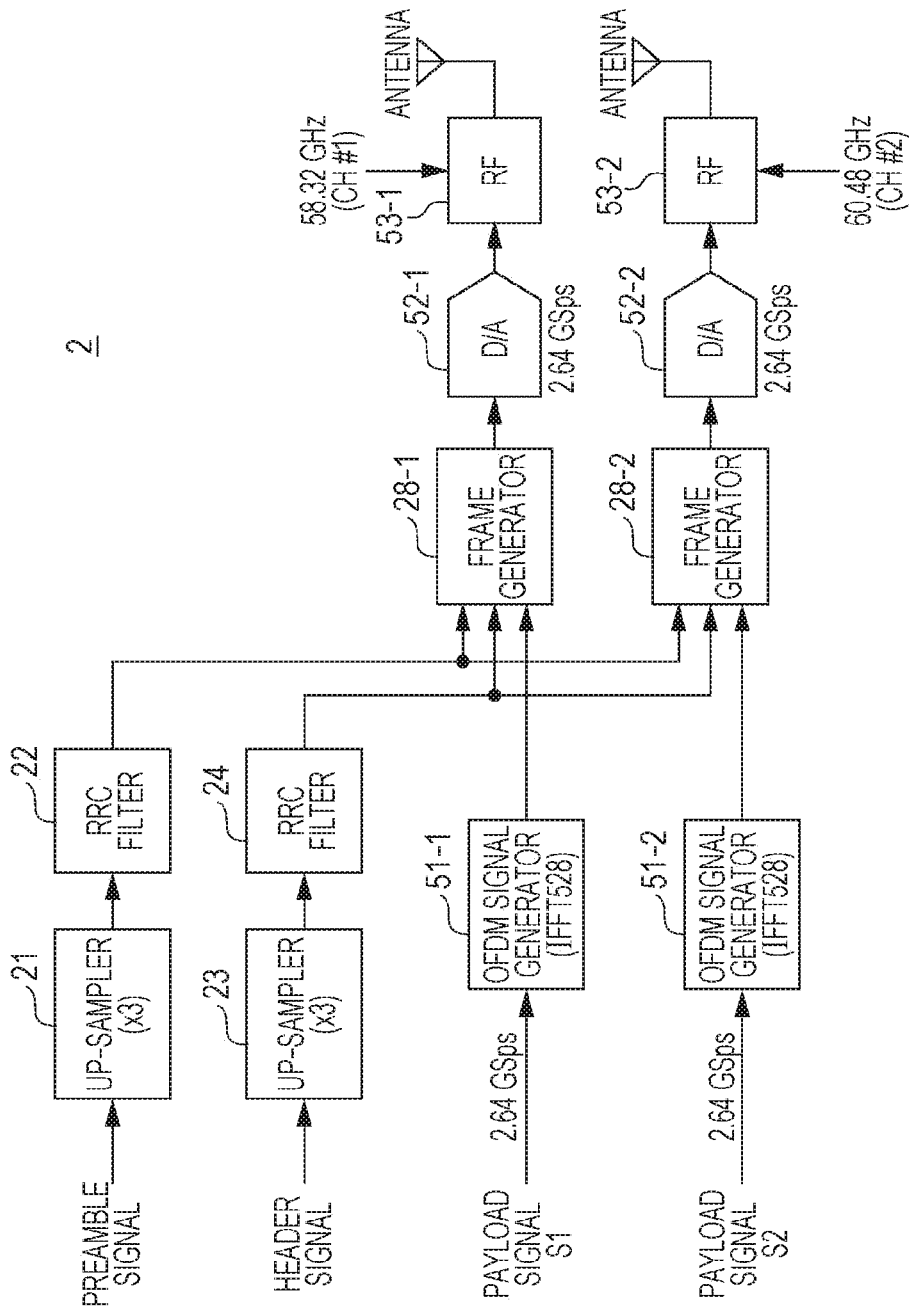
FIG. 19 is a diagram illustrating an example of a configuration of a communication apparatus including two RF circuits.

Next, a configuration of a communication apparatus 2 illustrated in FIG. 19 is described below. In FIG. 19, elements similar to those of the configuration illustrated in FIG. 3 or FIG. 7 are denoted by similar symbols and a description thereof is omitted.

The communication apparatus 2 illustrated in FIG. 19 performs aggregation transmission using two radio processors (RF circuits) 53-1 and 53-2. In the OFDM signal generators 51-1 and 51-2, the FFT size is set to 528 such that the channel interval is equal to an integral multiple of the frequency bin interval (the subcarrier interval).

Figure 20A:
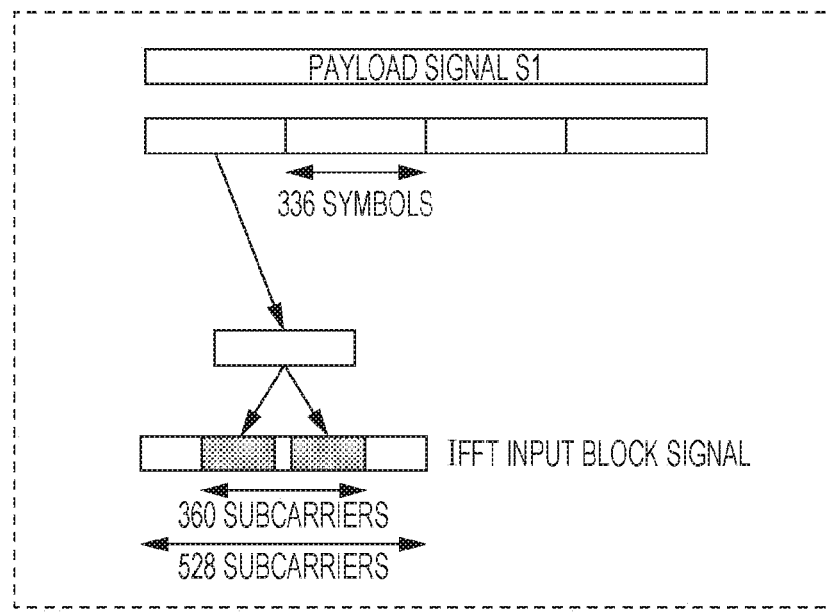
FIG. 20A is a diagram illustrating an example of a process of generating an OFDM signal in a channel 1 performed in a communication apparatus including two RF circuits.
Figure 20B:
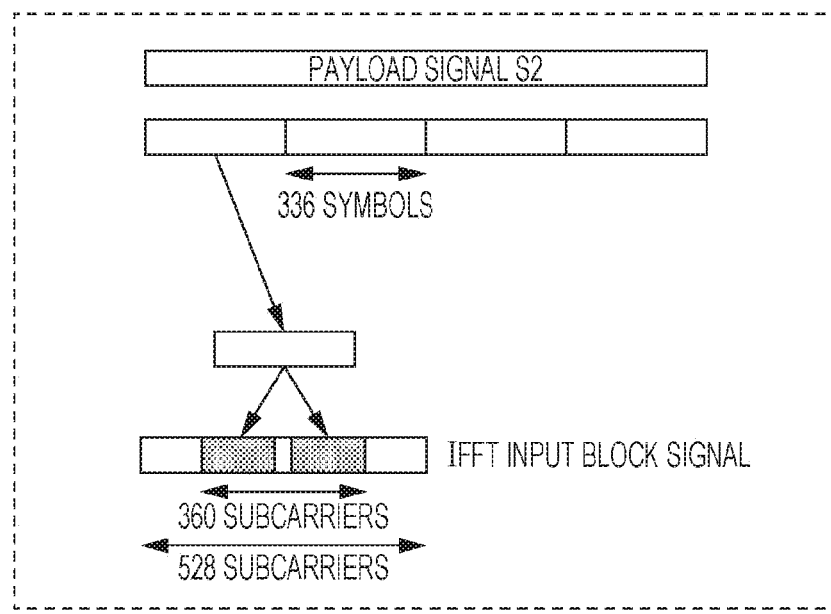
FIG. 20B is a diagram illustrating an example of a process of generating an OFDM signal in a channel 2 performed in a communication apparatus including two RF circuits.

FIG. 20A and FIG. 20B are diagrams illustrating an example of a manner of generating a frame format in the communication apparatus 2 illustrated in FIG. 19. FIG. 20A illustrates an example of a process on a payload signal S1 in the OFDM signal generator 51-1, and FIG. 20B illustrates an example of a process on a payload signal S2 in the OFDM signal generator 51-2.

The OFDM signal generators 51-1 and 51-2 divide the payload signal S1 and the payload signal S2, which have been subjected to data modulation, into parts with predetermined lengths. In FIG. 20A and FIG. 20B, each payload signal is divided into parts each including 336 symbols.

Next, the OFDM signal generators 51-1 and 51-2 respectively extract 336 symbols from the payload signal S1 (the signal of the channel 1) and the payload signal S2 (the signal of the channel 2), and insert zero-signals or pilot signals (having known patterns preset in advance) and map respective signals into subcarriers having a total length of 528 subcarriers. As a result, an IFFT input block signal, which is to be input to the IFFT circuit, is obtained.

In the process described above, the payload signals S1 and S2 are each mapped in a range extending by 180 subcarriers from the center of 528 subcarriers to both sides, that is, in a range with a width of 360 subcarriers around the center of the 528 subcarriers (that is, the number of subcarriers is determined by a spectral restriction of each channel) as illustrated in FIG. 20A or FIG. 20B.

In the OFDM signal generators 51-1 and 51-2, the IFFT input block signals illustrated in FIG. 20A and FIG. 20B are input to the IFFT circuits, and CP are added to each output signal. As a result, two OFDM signals with 2.64 GSps are generated. In the frame generators 28-1 and 28-2 illustrated in FIG. 19, each output signal with the added CP is further added with a preamble signal and a header signal. As a result, transmission digital baseband signals are obtained.

These transmission digital baseband signals are then subjected to D/A conversion at 2.64 GSps in the respective D/A converters 52-1 and 52-2, and further subjected to radio processes with center frequencies set to 58.32 GHz and 60.48 GHz in the radio processors 53-1 and 53-2. As a result, a signal with a spectrum illustrated in FIG. 1 is transmitted. In the configuration illustrated in FIG. 19, the bandwidths set for the D/A converters 52-1 and 52-2 and radio processors 53-1 and 53-2 are narrow compared with the bandwidths set in the configuration illustrated in FIG. 13, and thus it is possible to generate a transmission signal with high quality (low distortion).

The configuration of the communication apparatus 2 that performs the aggregation transmission using the two RF circuits has been described.

That is, it is possible, using the same single receiver, to receive both the signal transmitted form the communication apparatus 200 shown in FIG. 13 and the signal transmitted from the communication apparatus 2 shown in FIG. 19.

Next, a comparison is made between the communication apparatus 200 shown in FIG. 13 and the communication apparatus 2 shown in FIG. 19.

Transmission using a similar frame format (for example, see FIG. 15) can be realized using one IFFT circuit, one D/A circuit, and an RF circuit in the case of the communication apparatus 200, and can be realized using two IFFT circuits, two D/A circuits, and two RF circuits in the case of the communication apparatus 2.

That is, the communication apparatus 200 can be realized with a small circuit scale and can be operated with small consumption power compared with the configuration of the communication apparatus 2.

Third Embodiment

In the first embodiment, in the OFDM signal generator 105 of the communication apparatus 100 (see FIG. 7), because the FFT size (in units of FFT points) is 1024, the center frequency is set not to 1.080 GHz but to 1.077 GHz. Instead, in a third embodiment, a deviation of the center frequency is adjusted using phase shift as described below.

Figure 21:
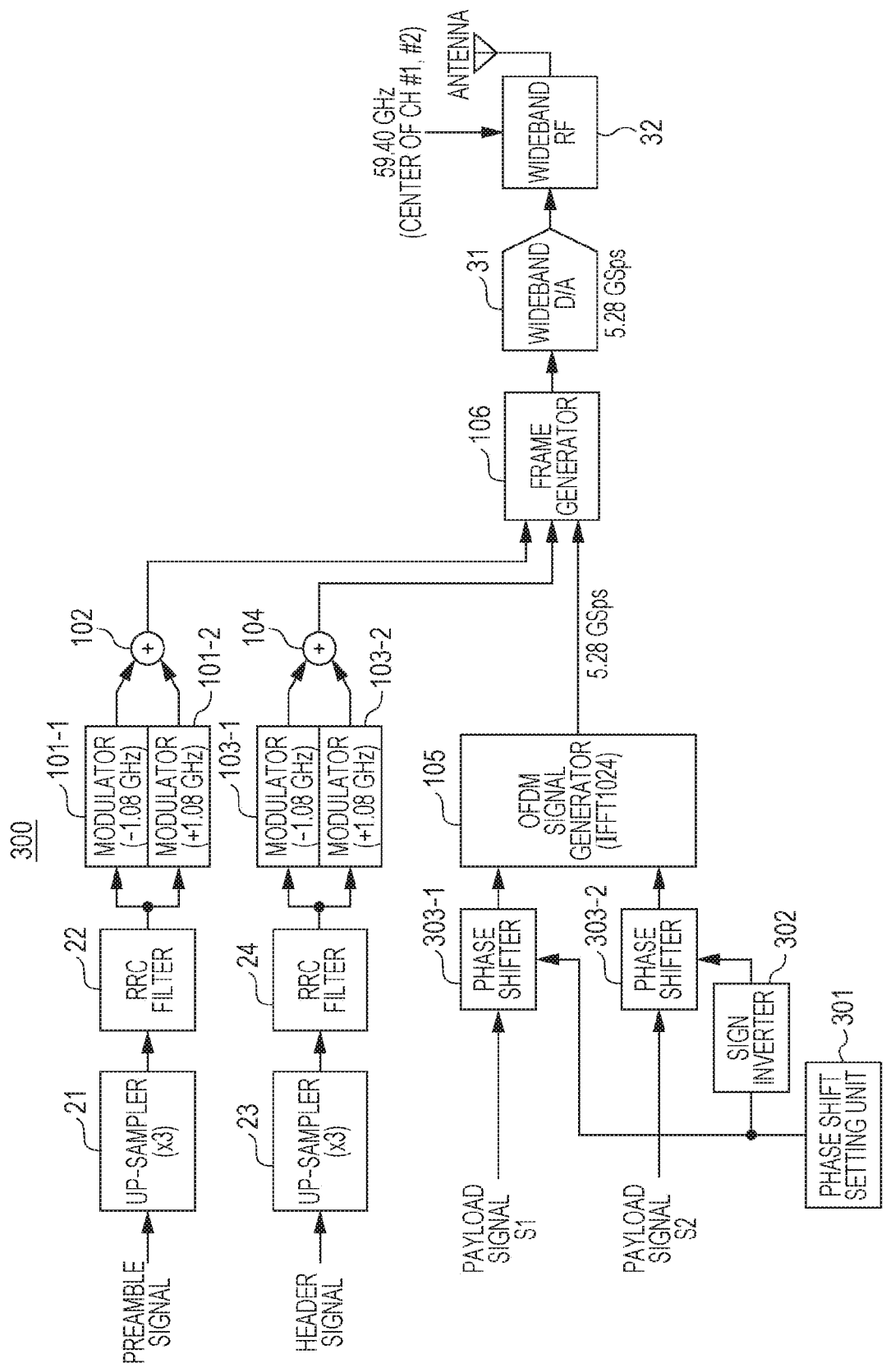
FIG. 21 is a diagram illustrating an example of a configuration of a communication apparatus according to a third embodiment.

FIG. 21 is a block diagram illustrating a configuration of a communication apparatus 300 according to the present embodiment. In FIG. 12, elements similar to those according to the first embodiment (FIG. 7) are denoted by the same symbols and a description thereof is omitted. More specifically, the configuration in FIG. 21 additionally includes a phase shift setting unit 301, a sign inverter 302, phase shifters 303-1 and 303-2.

Although frequency shifting methods (methods of shifting phases of signals in time domain) are known, it is difficult to shift frequencies independently for two channels 1 and 2 (ch1 and ch2).

In view of the above, in the communication apparatus 300, the phase shifters 303-1 and 303-2 in front of the OFDM signal generator 105 shift phases by predetermined amounts for each of symbol blocks obtained as a result of dividing payload signals of the respective channels. The amounts of phase shifts are set in advance in the phase shift setting unit 301.

Figure 22A:
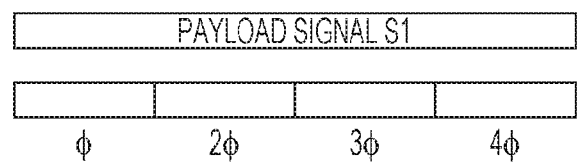
FIG. 22A is a diagram illustrating an example of a manner of applying phase shifts to a payload signal S1 according to the third embodiment.

For example, as illustrated in FIG. 22A, for the payload signal S1, a first symbol block (a 336-symbol block) is shifted in phase by $\varphi$ rad (radian), a second symbol block is shifted in phase by $2\varphi$ rad, and an nth symbol block is shifted in phase by $n\varphi$ rad. That is, the amount of the phase shift increases with the symbol block number (n is an integer equal to or greater than 1).

Figure 22B:
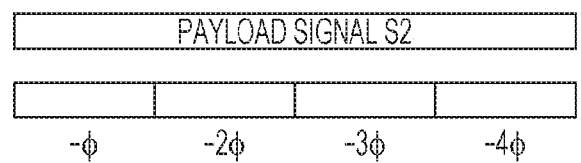
FIG. 22B is a diagram illustrating an example of a manner of applying phase shifts to a payload signal S2 according to the third embodiment.

On the other hand, in the payload signal S2, as illustrated in FIG. 22B, the phase shift is applied by a sign opposite to that for the payload signal S1. A process of inverting the sign of the amount of phase shift is performed by the sign inverter 302.

Here, $\varphi$ is determined by a deviation $\Delta$ (GHz) of the center frequency, the carrier frequency f, and (OFDM symbol length+CP length) L according to a formula described below.

$$\varphi=(\Delta/f)*L*2\pi[\text{rad}]$$

Example of calculation
$\Delta$=1080 MHz−(5280 MHz/1024*209)=2.34375 MHz
f=60 GHz
L=512+128=640
$\varphi$=0.057$\pi$ As a result, a phase shift to be applied to a sample (for example, a 320th sample) located at the center of a time-domain signal with a total of 640 samples including the OFDM symbols and CP is equally applied to all 640 samples. Thus, although a spectrum identical to that shown in FIG. 14 is not obtained, a reduction in reception signal error in the OFDM receiver and an increase in signal quality are achieved. Unlike the conventional technique in which a phase shift is applied to a time-domain signal, it is possible to achieve approximate frequency shift independently for the channels ch1 and ch2.

As for the carrier frequency f, using the center frequency of the channel 1 (ch1) allows it to most accurately calculate the deviation for the payload signal S1, and using the center frequency of the channel 2 (ch2) allows it to most accurately calculate the deviation for the payload signal S2. However, in a simplified version, the center frequency between the channels 1 and 2 (ch1 and ch2) may be employed as the carrier frequency f. In a further simplified version, 60 GHz may be used as an approximate value of the carrier frequency 1.

Thus, the method described above makes it possible to adjust the center frequency of each payload signal to 1.08 GHz also in a case where aggregation transmission is performed using the OFDM signal generator 105 with the FFT size of 1024 points.

Fourth Embodiment

In the first embodiment, in the OFDM signal generator 105 of the communication apparatus 100 (see FIG. 7), because the FFT size (in units of FFT points) is 1024, the center frequency is set not to 1.080 GHz but to 1.077 GHz. Instead, in a fourth embodiment, the carrier frequency of the wideband RF is adjusted as described below.

Figure 23:
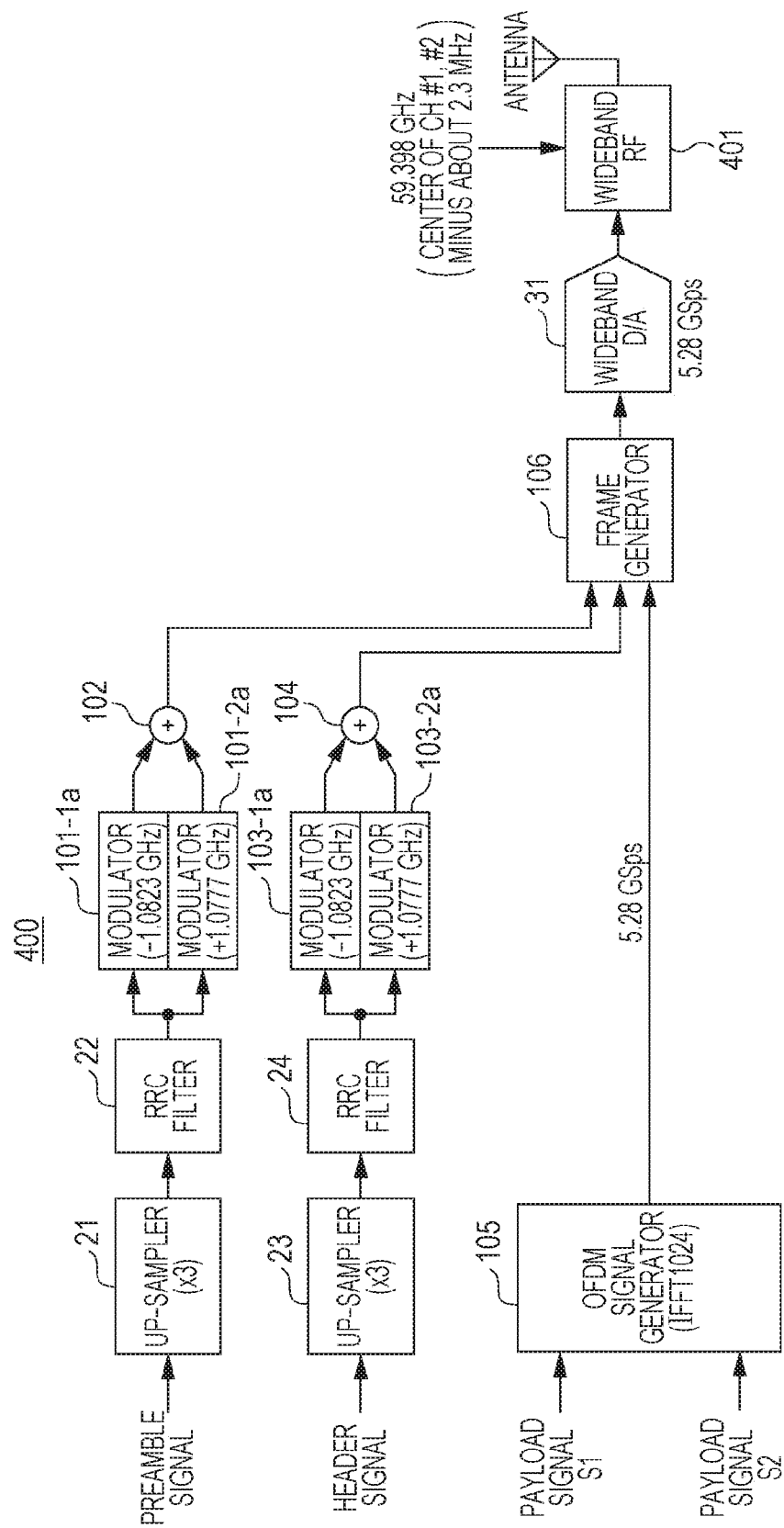
FIG. 23 is a diagram illustrating an example of a configuration of a communication apparatus according to a fourth embodiment.

FIG. 23 is a block diagram illustrating an example of a configuration of a communication apparatus 400 according to the present embodiment. In FIG. 23, elements similar to those according to the first embodiment (FIG. 7) are denoted by the same symbols and a description thereof is omitted. More specifically, in the configuration in FIG. 23, modulators 101-1a and 101-2a modulators 103-1a and 103-2a and a wideband radio processor 401 (RF circuit) operate in a different manner from that according to the first embodiment.

In FIG. 23, of two channels, a channel 1 (ch1) is defined as a primary channel. To precisely set the center frequency of the primary channel, the wideband radio processor 401 adjusts the carrier frequency to be lower by about 2.3 MHz (to 59.398 GHz in the case of FIG. 23). Note that about 2.3 MHz corresponds to a shift of the center frequency of the primary channel.

Note that as a result the adjustment of the carrier frequency by the wideband radio processor 401, the two channels are adjusted to values lowered by 2.3 MHz.

Figure 24A:
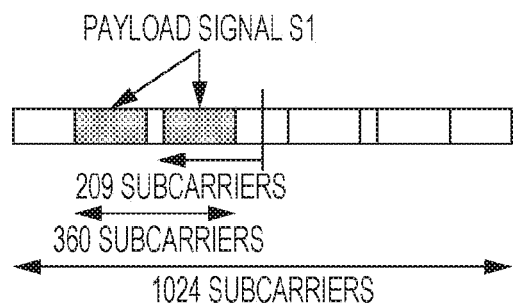
FIG. 24A is a diagram illustrating an example of a process of generating an OFDM signal of a payload signal S1 according to the fourth embodiment.
Figure 24B:
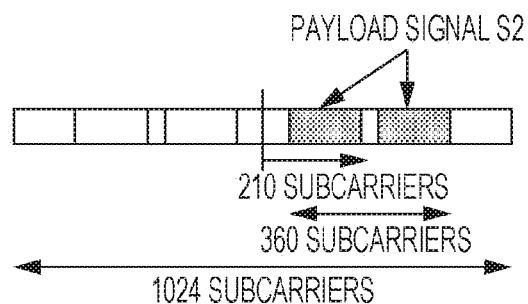
FIG. 24B is a diagram illustrating an example of a process of generating an OFDM signal of a payload signal S2 according to the fourth embodiment.

Therefore, as illustrated in FIG. 24A and FIG. 24B, to bring the centers of the channels 1 and 2 (ch1 and ch2) to be close to each other as possible, the center subcarrier is set, for the payload signal S1, at a location 209 subcarriers apart from the center of the 1024 subcarriers, while for the payload signal S2, the center subcarrier is set at a location 210 subcarriers apart from the center of the 1024 subcarriers.

Furthermore, to transmit the preamble signal and the header signal at the same frequency as the frequency of the payload signals S1 and S2 subjected to the adjustment, the modulators 101-1a, 101-2a, 103-1a, and 103-2a shown in FIG. 23 are set such that frequencies are shifted to values 2.3 MHz lower than the values to which frequencies are shifted by the modulators 101-1, 101-2, 103-1, and 103-2 shown in FIG. 7.

As a result of the adjustment shown in FIG. 23, FIG. 24A, and FIG. 24B, the payload signal S1 which is the primary channel, the preamble of the channel 1, and the header signal of the channel 1 are adjusted such that the center frequency is 1.080 GHz, while the payload signal S2, the preamble of the channel 2, and the header signal of the channel 2 are adjusted such that the center frequency is 1.08047 GHz.

Figure 26:
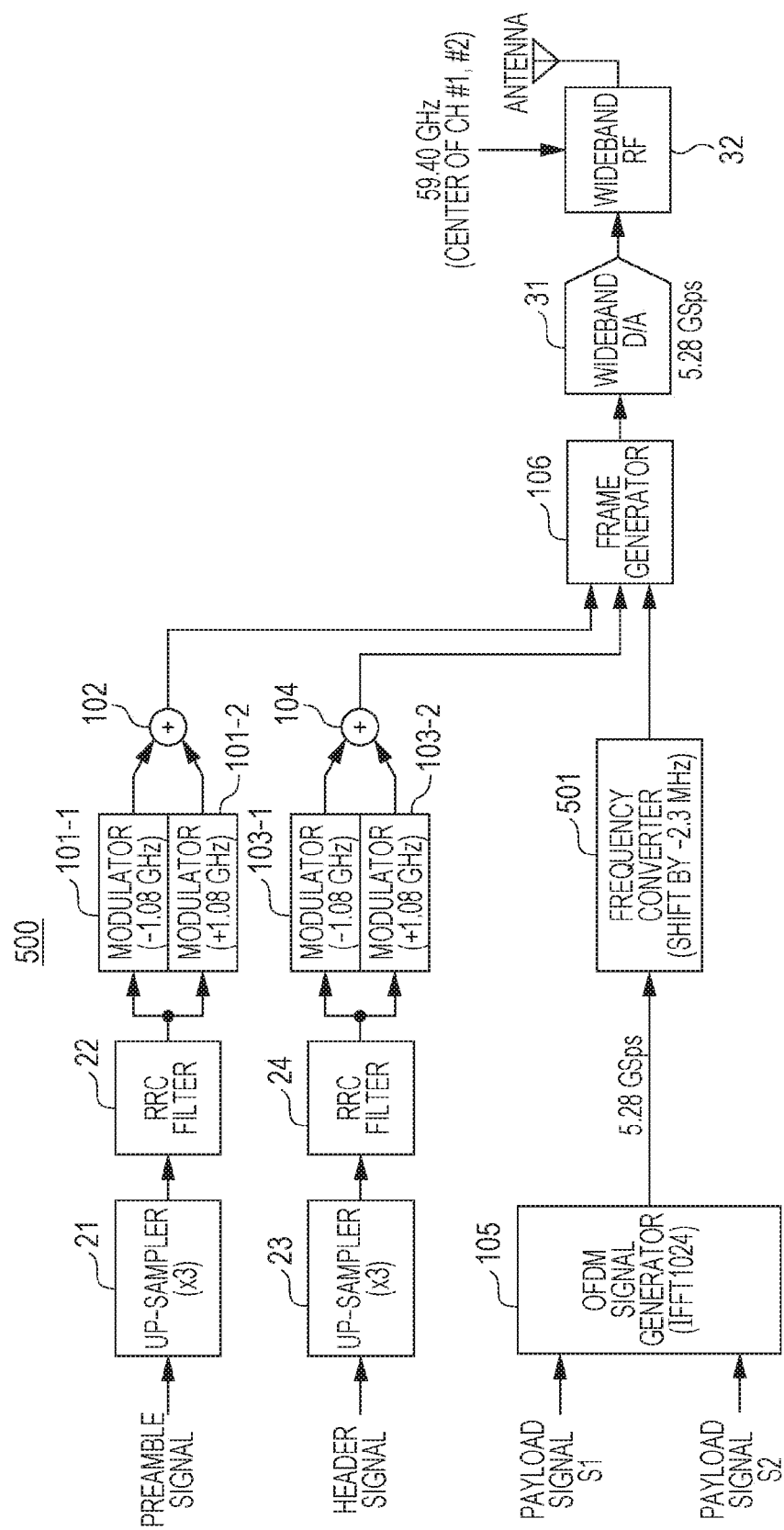
FIG. 26 is a diagram illustrating another example of a configuration of a communication apparatus according to the fourth embodiment.

As for another method, the communication apparatus 500 shown in FIG. 26 is capable of generating a signal similar to that generated by the communication apparatus shown in FIG. 23. The configuration shown in FIG. 26 additionally includes a frequency converter 501 by which, after subcarriers are allocated by the OFDM signal generator 105 as shown in FIG. 24A and FIG. 24B in a similar manner as with the configuration shown in FIG. 23, frequency of the output OFDM signal is shifted to a value lowered by 2.3 MHz. Therefore, in the configuration shown in FIG. 26, unlike the configuration shown in FIG. 23, the frequency of the wideband RF circuit (the wideband radio processor 32) is not changed.

Thus, the method described above makes it possible to adjust the center frequency of the payload signal of the primary channel to 1.08 GHz also in a case where aggregation transmission is performed using the OFDM signal generator 105 with the FFT size of 1024 points, and the center frequency of a payload signal of a channel other than the primary channel can be brought close to 1.08 GHz.

Figure 27:
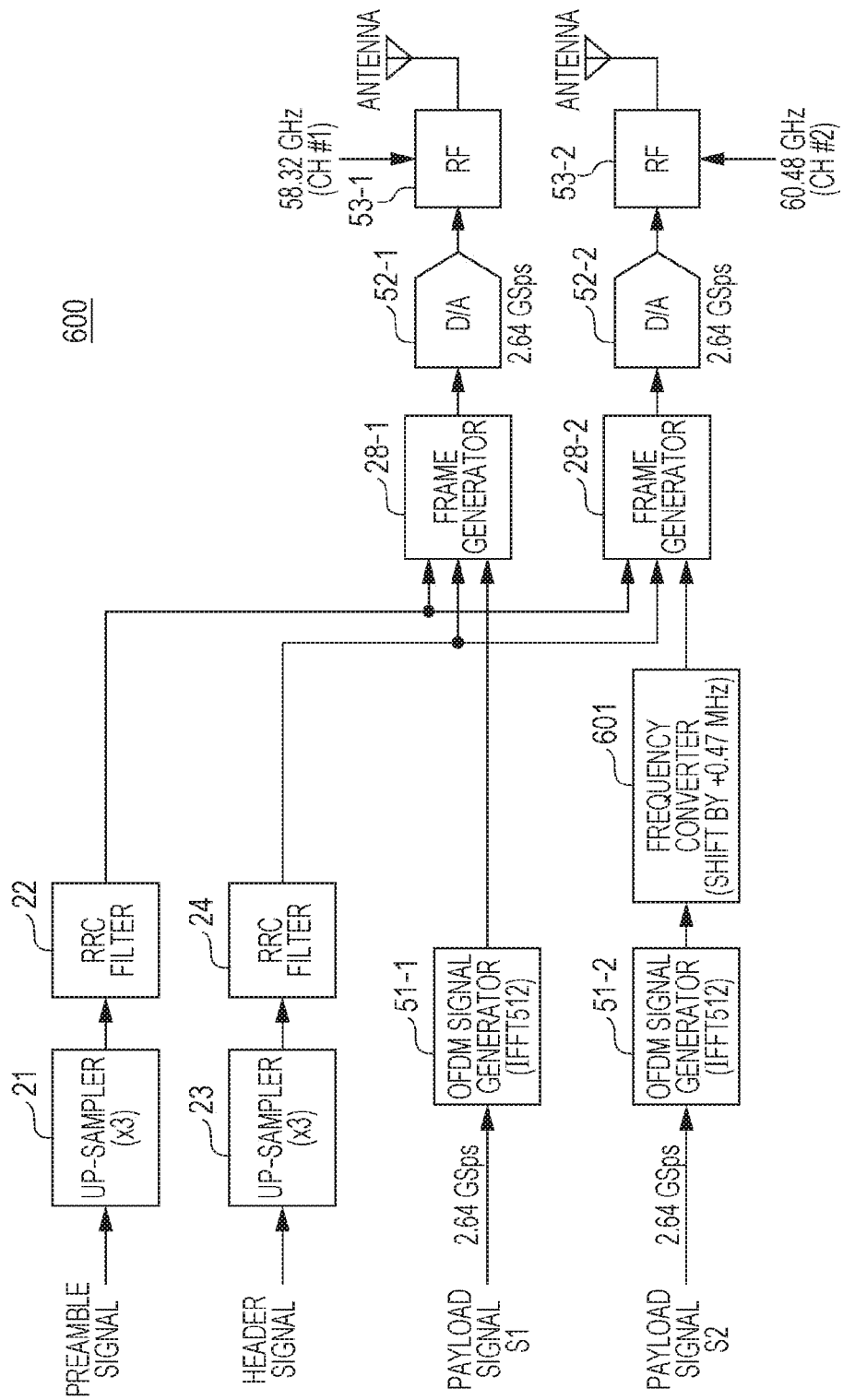
FIG. 27 is a diagram illustrating another example of a configuration of a communication apparatus according to the fourth embodiment.

As for another method, the communication apparatus 600 shown in FIG. 27 is capable of generating a signal similar to that generated by the communication apparatus shown in FIG. 23. The configuration shown in FIG. 27 additionally includes a frequency converter 601 by which, after subcarriers are allocated by the OFDM signal generators 51-1 and 51-2 as shown in FIG. 20A and FIG. 20B in a similar manner as with the configuration shown in FIG. 19, the OFDM signal generated from the payload signal S2, which is one of output OFDM signals, is subjected to frequency shift that results in an increase in frequency by 0.47 MHz. Thus, in FIG. 27, the frequencies of the RF circuits are equal to the center frequencies of the respective channels, and thus it is possible to transmit, using a single transmitter, both the OFDM signal and the single carrier signal.

As described above, the signal transmitted from the communication apparatus 600 shown in FIG. 27 is similar to that transmitted from the communication apparatus 400 shown in FIG. 23, and thus it is possible to receive, using the same receiver, both the signal transmitted from the communication apparatus 400 shown in FIG. 23 and the signal transmitted from the communication apparatus 600 shown in FIG. 27.

Note that in the fourth embodiment, the primary channel may be a primary channel defined in a MAC layer. For example, a notification of which channel is a primary channel may be given via a beacon frame transmitted from an access point and other control frames.

In the fourth embodiment, the primary channel may be fixed to a channel, For example, ch1 may be determined as the primary channel.

Figure 28:
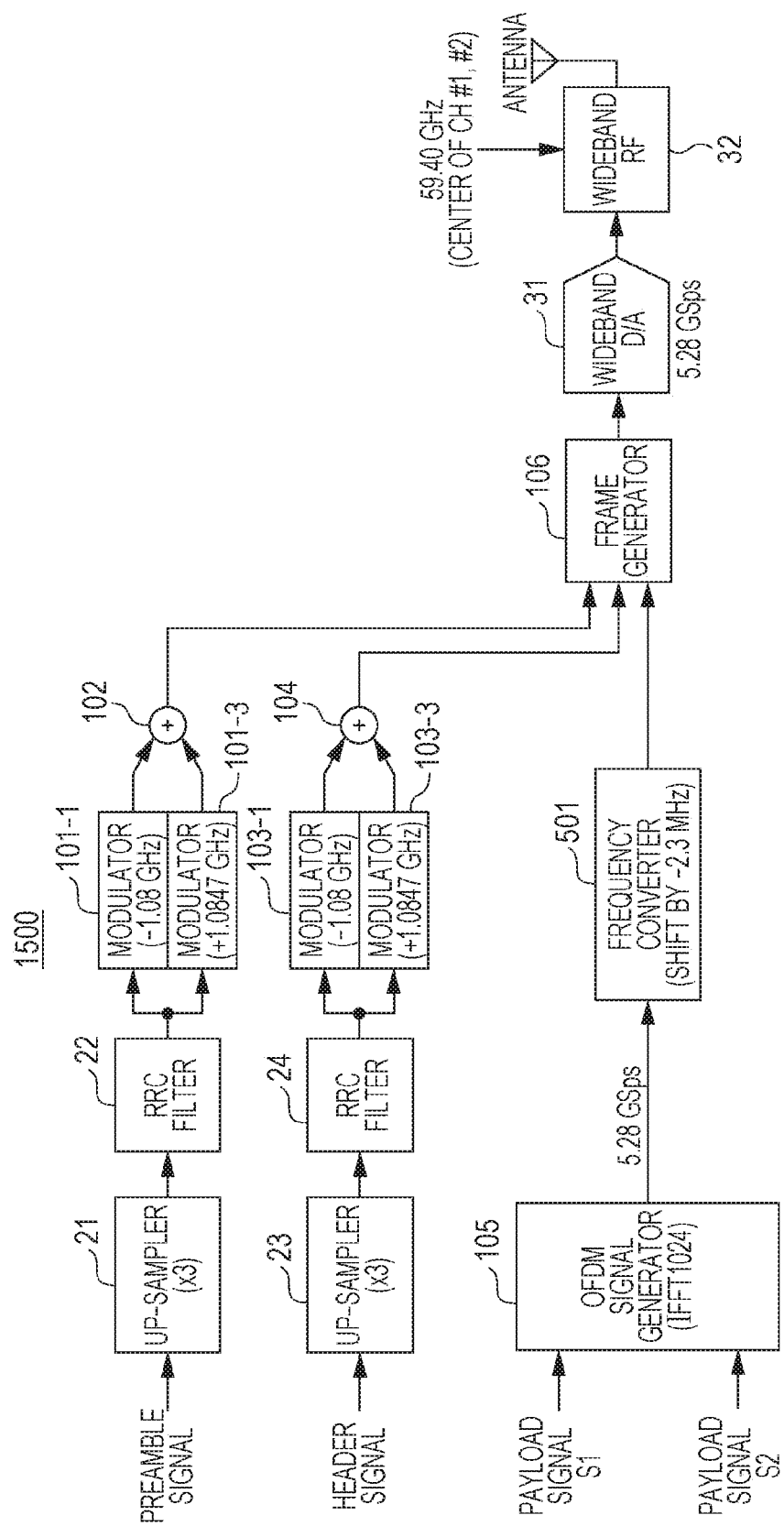
FIG. 28 is a diagram illustrating another example of a configuration of a communication apparatus according to the fourth embodiment.

Furthermore, in the communication apparatus 1500 shown in FIG. 28, the frequency converter 501 is provided to process the OFDM signal as with the configuration shown in FIG. 26, and furthermore, the modulators 101-1 and 103-2, which are part of the modulators 101 and 103 that modulate the preamble signal and the header signal but which are not involved with the primary channel, are adapted such that the modulation frequency thereof is shifted by 0.47 MHz, that is, the modulation frequency is set to 1.0847 GHz.

Figure 25:
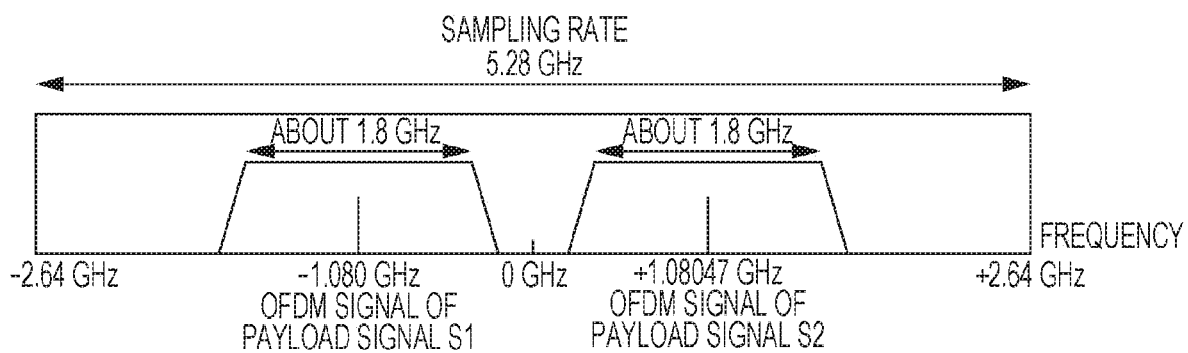
FIG. 25 is a diagram illustrating an example of a spectrum of a signal generated by a communication apparatus according to the fourth embodiment.

That is, in contrast to the configuration shown in FIG. 26 in which the center frequency of the OFDM signal of the payload 2 is shifted as shown in FIG. 25, in the configuration shown in FIG. 28, the center frequency is also shifted for preamble and the header in a similar manner as in FIG. 25. Thus, in the configuration shown in FIG. 28, the center frequency is equal for the preamble, the header, and the baseband signal of the payload signal S2 transmitted in ch2, and thus there is no discontinuity due to frequency deviation, and thus it is possible to simplify the configuration of the receiver.

Figure 29:
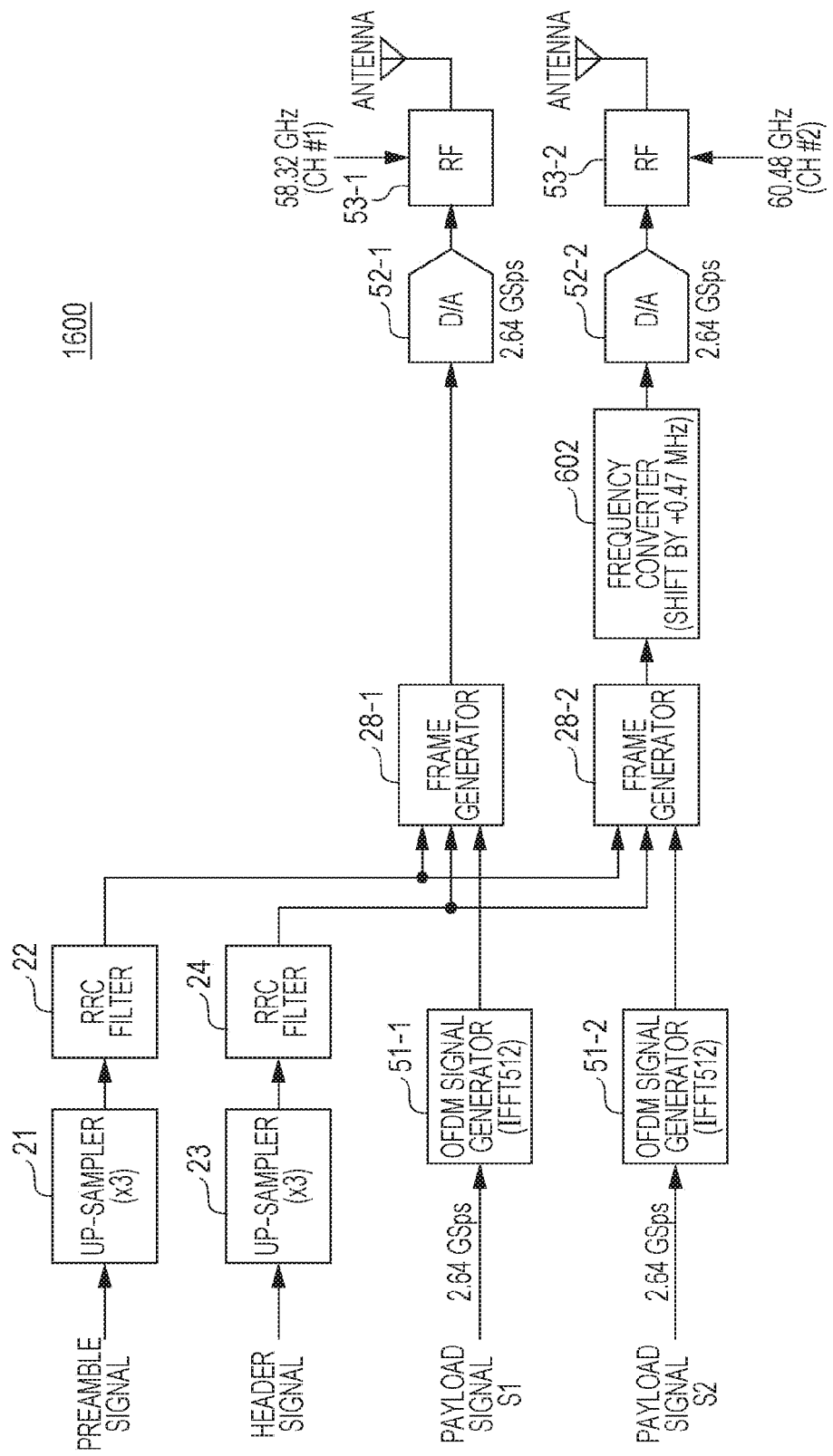
FIG. 29 is a diagram illustrating another example of a configuration of a communication apparatus according to the fourth embodiment.

In a communication apparatus 1600 illustrated in FIG. 29, unlike the configuration shown in FIG. 27, a frequency converter 602 is disposed at a stage following a frame generator 28. That is, in the configuration shown in FIG. 29, the center frequency of the OFDM signal of the payload 2 as in the configuration shown in FIG. 27, but in the configuration shown in FIG. 29, the center frequency is also shifted for the preamble and the header in a similar manner as illustrated in FIG. 25. As a result, the center frequency is equal for the preamble, the header, and the baseband signal of the payload signal S2 transmitted in ch2, and thus there no discontinuity due to a frequency deviation, and thus it is possible to simplify the configuration of the receiver.

Furthermore, as described above, the communication apparatus 1600 shown in FIG. 29 is similar, in terms of the output signal, to the communication apparatus 1500 shown in FIG. 28, it is possible, using the same single receiver, to receive both the signal transmitted form the communication apparatus 1500 shown in FIG. 28 and the signal transmitted from the communication apparatus 1600 shown in FIG. 29.

The embodiments of the present disclosure have been described above.

Parameter values used in the embodiments described above, in terms of the channel bandwidth, the channel interval, the sampling rate, the FFT size, the center frequency of each channel, and the like are merely examples, and the parameter values are not limited to these examples.

In the embodiments described above, it is assumed by way of example that the present disclosure is implemented using hardware. However, the present disclosure may be implemented using software in cooperation with hardware.

Each functional block according to the embodiments described above may be typically realized by an integrated circuit such as an LSI. The integrated circuit may control each functional block explained in the embodiments and may include an input terminal and an output terminal. Each of the functional blocks may be formed individually on one chip, or part or all of the functional blocks may be formed on one chip. As for the integrated circuit usable as the LSI, they may be called differently depending on the integration scale, such as an IC, a system LSI, a super LSI, an ultra LSI, and the like Furthermore, the technique of implementing the integrated circuit is not limited to the LSI, but the integrated circuit may be realized in other forms such as a dedicated circuit or a general-purpose processor. The integrated circuit may also be realized using an FPGA (Field Programmable Gate Array) that can be programmed after the manufacture of the LSI or a reconfigurable processor that is allowed to be reconfigured in terms of the connection or the setting of circuit cells in the inside of the LSI.

When a new integration circuit technology appears in the future that can replace the LSI technology as a result of an advance in semiconductor technology or related technology, the functional blocks may be realized using such a new technology. A possible example of a new technology is biotechnology.

The transmission apparatus according to the present disclosure includes signal carrier signal circuitry that generates two single carrier signals including a legacy preamble signal, a legacy header signal and an extension header signal respectively, OFDM signal circuitry that generates one OFDM signal by performing an IFFT processing on one or more payload signals, and transmission circuitry that transmits the two single carrier signals by allocating to a bonding channel which is formed by bonding two adjacent channels used in a bonding transmission scheme and the one OFDM signal by allocating to the bonding channel which is frequency-shifted.

In the transmission apparatus according to the present disclosure, an interval between the two adjacent channels is 2.16 GHz, a sampling rate in the IFFT processing is 5.28 GHz, and the FFT size is 1024, and a center frequency of the bonding channel which is frequency-shifted correspond to a frequency separated by 209 subcarriers from the center frequency of one of the two adjacent channels.

The reception apparatus according to the present disclosure includes reception circuitry that receives a signal using a bonding transmission scheme, processing circuitry that generates one or more payload signals by performing a FFT processing on the received signal; wherein the received signal is generated in a transmission apparatus and includes two single carrier signals and one OFDM signal, the two single carrier signals includes a legacy preamble signal, a legacy header signal and an extension header signal respectively, and are allocated to a bonding channel which is formed by bonding two adjacent channels used in the bonding transmission scheme, the one OFDM signal is generated by performing an IFFT processing on the one or more payload signals and is allocated to the bonding channel which is frequency-shifted.

In the reception apparatus according to the present disclosure, an interval between the two adjacent channels is 2.16 GHz, a sampling rate in the IFFT processing is 5.28 GHz, and the FFT size is 1024, and a center frequency of the bonding channel which is frequency-shifted correspond to a frequency separated by 209 subcarriers from the center frequency of one of the two adjacent channels.

A transmission method according to the present disclosure includes generating two single carrier signals including a legacy preamble signal, a legacy header signal, and an extension header signal respectively, generating one OFDM signal by performing an IFFT processing on one or more payload signals, and transmitting the two single carrier signals by allocating to a bonding channel which is formed by bonding two adjacent channels used in a bonding transmission scheme and the one OFDM signal by allocating to the bonding channel which is frequency-shifted.

A transmission method according to the present disclosure includes an interval between the two adjacent channels is 2.16 GHz, a sampling rate in the IFFT processing is 5.28 GHz, and the FFT size is 1024, and a center frequency of the bonding channel which is frequency-shifted correspond to a frequency separated by 209 subcarriers from the center frequency of one of the two adjacent channels.

A reception method according to the present disclosure includes receiving a signal using a bonding transmission scheme, generating one or more payload signals by performing a FFT processing on the received signal, wherein the received signal is generated in a transmission apparatus and includes two single carrier signals and one OFDM signal, the two single carrier signals includes a legacy preamble signal, a legacy header signal and an extension header signal respectively, and are allocated to a bonding channel which is formed by bonding two adjacent channels used in the bonding transmission scheme, and the one OFDM signal is generated by performing an IFFT processing on the one or more payload signals and is allocated to the bonding channel which is frequency-shifted, A reception method according to the present disclosure includes an interval between the two adjacent channels is 2.16 GHz, a sampling rate in the IFFT processing is 5.28 GHz, and the FFT size is 1024, and a center frequency of the shifted bonding channel which is frequency-shifted correspond to a frequency separated by 209 subcarriers from the center frequency of one of the two adjacent channels.

An aspect of the present disclosure is preferable for use in a communication apparatus and a communication method according to the 11ad standard.

What is claimed is:

1. A transmission apparatus comprising:
single carrier signal circuitry which, in operation, generates a first single carrier signal and a second single carrier signal, each of the first and second single carrier signals including a legacy preamble signal, a legacy header signal and an extension header signal, the legacy preamble signal including a short training field (STF) and a channel estimation field (CEF);
orthogonal frequency-division multiplexing (OFDM) signal circuitry which, in operation,
  sets a first center frequency of a first payload signal to a position that is 209 subcarriers lower from a center of 1024 consecutive subcarriers;
  sets a second center frequency of a second payload signal to another position that is 210 subcarriers higher from the center of the 1024 consecutive subcarriers;
  performs inverse fast Fourier transform (IFFT) processing on the first payload signal and the second payload signal and generates one OFDM signal to be mapped on a bonding channel comprising a first channel and a second channel, wherein a fast Fourier transform (FFT) size is 1024; and
  shifts the generated OFDM signal by an offset amount that is a difference between a center-frequency of the first channel and one of the 1024 consecutives subcarriers;
frame generation circuitry which, in operation, generates a frame by:
  mapping the first single carrier signal and the second single carrier signal respectively to the first channel and the second channel; and
  mapping the shifted OFDM signal to the bonding channel; and
transmission circuitry which, in operation, transmits the generated frame over the bonding channel.

2. The transmission apparatus according to claim 1, wherein
an interval between the first channel and the second channel is 2.16 GHz,
a sampling rate in the IFFT processing is 5.28 GHz, and
a center frequency of the bonding channel corresponds to a frequency separated by 209 subcarriers from a center frequency of the first channel.

3. The transmission apparatus according to claim 1, wherein a gap between a shifted center frequency of the bonding channel and the center frequency of the one of the first and second channels is an integer multiple of a subcarrier spacing.

4. A reception apparatus comprising:
reception circuitry which, in operation, receives a signal mapped to a bonding channel; and
processing circuitry which, in operation, generates a first payload signal and a second payload signal by performing fast Fourier transform (FFT) processing on the received signal; wherein:
the received signal is generated in a transmission apparatus and includes a first single carrier signal mapped to a first channel, a second single carrier signal mapped to a second channel and an orthogonal frequency-division multiplexing (OFDM) signal mapped to the bonding channel,
each of the first and second single carrier signals includes a legacy preamble signal, a legacy header signal and an extension header signal, the legacy preamble signal including a short training field (STF) and a channel estimation field (CEF),
a first center frequency of the first payload signal is set to a position that is 209 subcarriers lower from a center of 1024 consecutive subcarriers, a second center frequency of the second payload signal is set to another position that is 210 subcarriers higher from the center of the 1024 consecutive subcarriers,
the one OFDM signal is generated by performing inverse fast Fourier transform (IFFT) processing on the first payload signal and the second payload signal and generating one OFDM signal to be mapped on the bonding channel comprising the first channel and the second channel,
an FFT size is 1024, and
the generated OFDM signal is shifted by an offset amount that is a difference between a center-frequency of the first channel and one of the 1024 consecutives subcarriers.

5. The reception apparatus according to claim 4, wherein
an interval between the first and second channels is 2.16 GHz,
a sampling rate in the IFFT processing is 5.28 GHz, and
a center frequency of the bonding channel corresponds to a frequency separated by 209 subcarriers from a center frequency of the first channel.

6. The reception apparatus according to claim 4, wherein a gap between a shifted center frequency of the bonding channel and the center frequency of the one of the first and second channels is an integer multiple of a subcarrier spacing.

7. A transmission method comprising:
generating a first single carrier signal and a second single carrier signal, each of the first and second single carrier signals including a legacy preamble signal, a legacy header signal and an extension header signal, the legacy preamble signal including a short training field (STF) and a channel estimation field (CEF);
setting a first center frequency of a first payload signal to a position that is 209 subcarriers lower from a center of 1024 consecutive subcarriers;
setting a second center frequency of a second payload signal to another position that is 210 subcarriers higher from the center of the 1024 consecutive subcarriers;
performing inverse fast Fourier transform (IFFT) processing on the first payload signal and the second payload signal and generating one orthogonal frequency-division multiplexing (OFDM) signal to be mapped on a bonding channel comprising a first channel and a second channel, wherein a fast Fourier transform (FFT) size is 1024;
shifting the generated OFDM signal by an offset amount that is a difference between a center-frequency of the first channel and one of the 1024 consecutives subcarriers;
generating a frame by:
  mapping the first single carrier signal and the second single carrier signal respectively to the first channel and the second channel; and
  mapping the shifted OFDM signal to the bonding channel; and
transmitting the generated frame over the bonding channel.

8. The transmission method according to claim 7, wherein
an interval between the first channel and the second channel is 2.16 GHz, a sampling rate in the IFFT processing is 5.28 GHz, and
a shifted center frequency of the bonding channel corresponds to a frequency separated by 209 subcarriers from a center frequency of the first channel.

9. The transmission method according to claim 7, wherein a gap between a shifted center frequency of the bonding channel and the center frequency of the one of the first and second channels is an integer multiple of a subcarrier spacing.

10. A reception method comprising:
receiving a signal mapped to a bonding channel; and
generating a first payload signal and a second payload signal by performing fast Fourier transform (FFT) processing on the received signal; wherein:
the received signal is generated in a transmission apparatus and includes a first single carrier signal mapped to a first channel, a second single carrier signal mapped to a second channel and an orthogonal frequency-division multiplexing (OFDM) signal mapped to the bonding channel,
each of the first and second single carrier signals including a legacy preamble signal, a legacy header signal and an extension header signal, the legacy preamble signal including a short training field (STF) and a channel estimation field (CEF),
a first center frequency of the first payload signal is set to a position that is 209 subcarriers lower from a center of 1024 consecutive subcarriers, a second center frequency of the second payload signal is set to another position that is 210 subcarriers higher from the center of the 1024 consecutive subcarriers,
the one OFDM signal is generated by performing inverse fast Fourier transform (IFFT) processing on the first payload signal and the second payload signal and generating one OFDM signal to be mapped on the bonding channel comprising the first channel and the second channel,
an FFT size is 1024, and
the generated OFDM signal is shifted by an offset amount that is a difference between a center-frequency of the first channel and one of the 1024 consecutives subcarriers.

11. The reception method according to claim 10, wherein an interval between the first channel and the second channel is 2.16 GHz,
a sampling rate in the IFFT processing is 5.28 GHz, and
a shifted center frequency of the bonding channel corresponds to a frequency separated by 209 subcarriers from a center frequency of the first channel.

12. The reception method according to claim 10, wherein a gap between a shifted center frequency of the bonding channel and the center frequency of the one of the first and second channels is an integer multiple of a subcarrier spacing.

* * * * *